(12) United States Patent
Christensen et al.

(10) Patent No.: US 10,296,093 B1
(45) Date of Patent: May 21, 2019

(54) ALTERING FEEDBACK AT AN ELECTRONIC DEVICE BASED ON ENVIRONMENTAL AND DEVICE CONDITIONS

(71) Applicant: Apple Inc., Cupertino, CA (US)

(72) Inventors: David L. Christensen, Los Altos Hills, CA (US); Daniel A. Greenberg, Santa Clara, CA (US); Thomas R. Matzinger, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 40 days.

(21) Appl. No.: 15/451,041

(22) Filed: Mar. 6, 2017

(51) Int. Cl.
*G06F 3/044* (2006.01)
*G06F 3/01* (2006.01)
*G06F 3/16* (2006.01)
*G06F 3/0481* (2013.01)

(52) U.S. Cl.
CPC .............. *G06F 3/016* (2013.01); *G06F 3/044* (2013.01); *G06F 3/0481* (2013.01); *G06F 3/167* (2013.01)

(58) Field of Classification Search
CPC ........ G06F 3/016; G06F 3/0481; G06F 3/044; G06F 3/167
See application file for complete search history.

(56) References Cited

U.S. PATENT DOCUMENTS

| | | | | |
|---|---|---|---|---|
| 2014/0125557 A1* | 5/2014 | Issayeva | ............. | G06F 3/04815 345/8 |
| 2014/0218853 A1* | 8/2014 | Pance | ................... | G06F 1/1616 361/679.4 |
| 2014/0354570 A1* | 12/2014 | Makinen | ................. | G06F 3/041 345/173 |
| 2016/0260252 A1* | 9/2016 | Kim | ....................... | G06T 19/003 |
| 2016/0334871 A1* | 11/2016 | Levesque | ................ | G06F 3/016 |
| 2017/0195629 A1* | 7/2017 | Wexler | ............. | G06F 17/30312 |
| 2017/0351330 A1* | 12/2017 | Gordon | .................... | G06F 1/163 |
| 2017/0351397 A1* | 12/2017 | Won | ..................... | G06F 3/03545 |
| 2017/0364154 A1* | 12/2017 | Levesque | ................ | G06F 1/163 |
| 2018/0139323 A1* | 5/2018 | Kim | ....................... | G06F 3/0416 |

* cited by examiner

*Primary Examiner* — Vinh T Lam
(74) *Attorney, Agent, or Firm* — Dickinson Wright RLLP

(57) ABSTRACT

The embodiments described herein generally relate to a portable electronic device. The portable electronic device can include a processor and a sensor coupled with the processor, the sensor capable of detecting a stimulus, and responding to the stimulus by providing a detection signal to the processor. The portable electronic device can further include an interface unit capable of interacting with a user. The portable electronic device can further include a feedback unit in communication with the interface unit and the processor, the feedback unit providing a feedback response that is perceptible to the user during the interaction, where when the sensor detects the stimulus, the detection signal provided to the processor by the sensor causes the processor to respond by instructing the feedback unit to alter the feedback response.

20 Claims, 23 Drawing Sheets

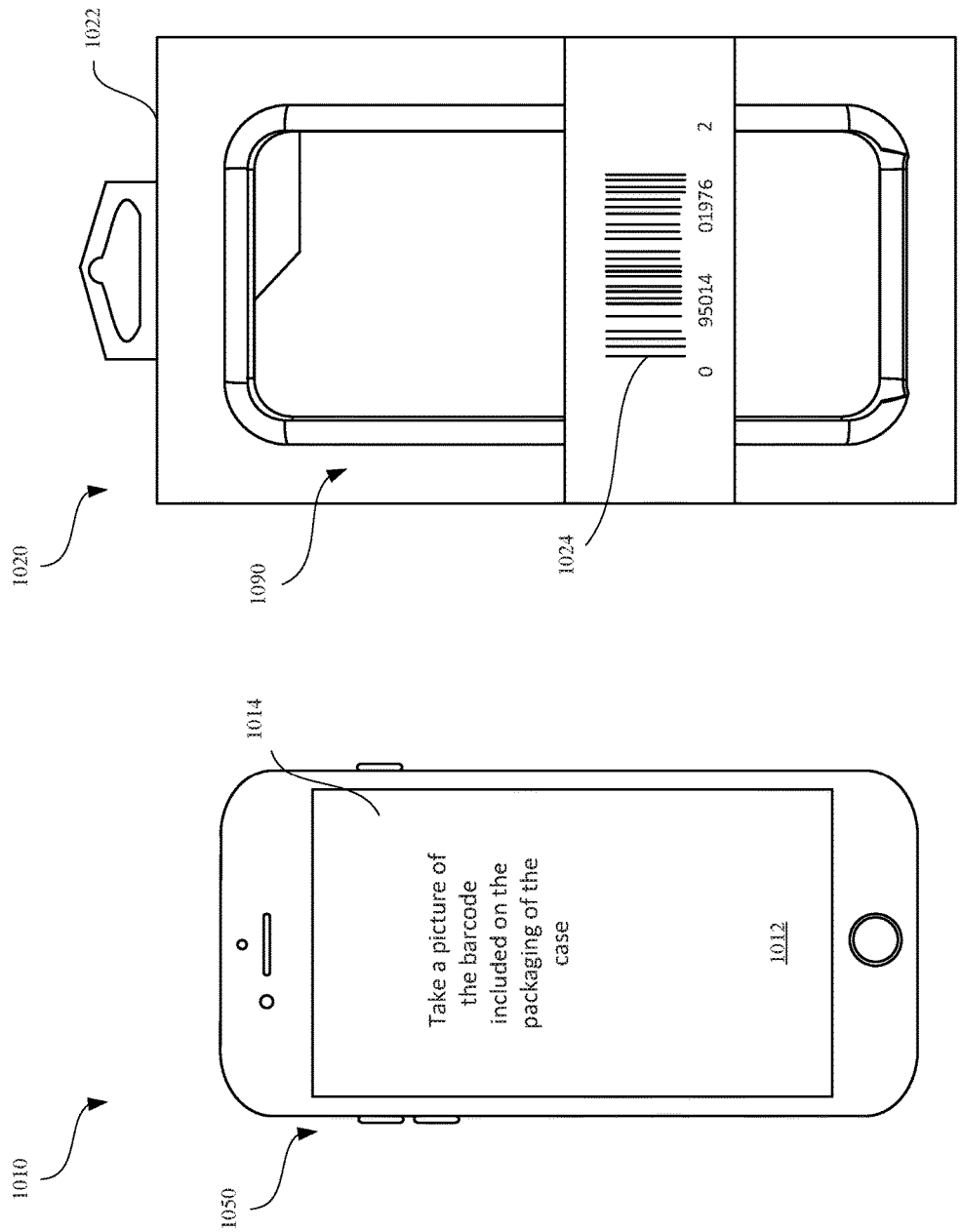

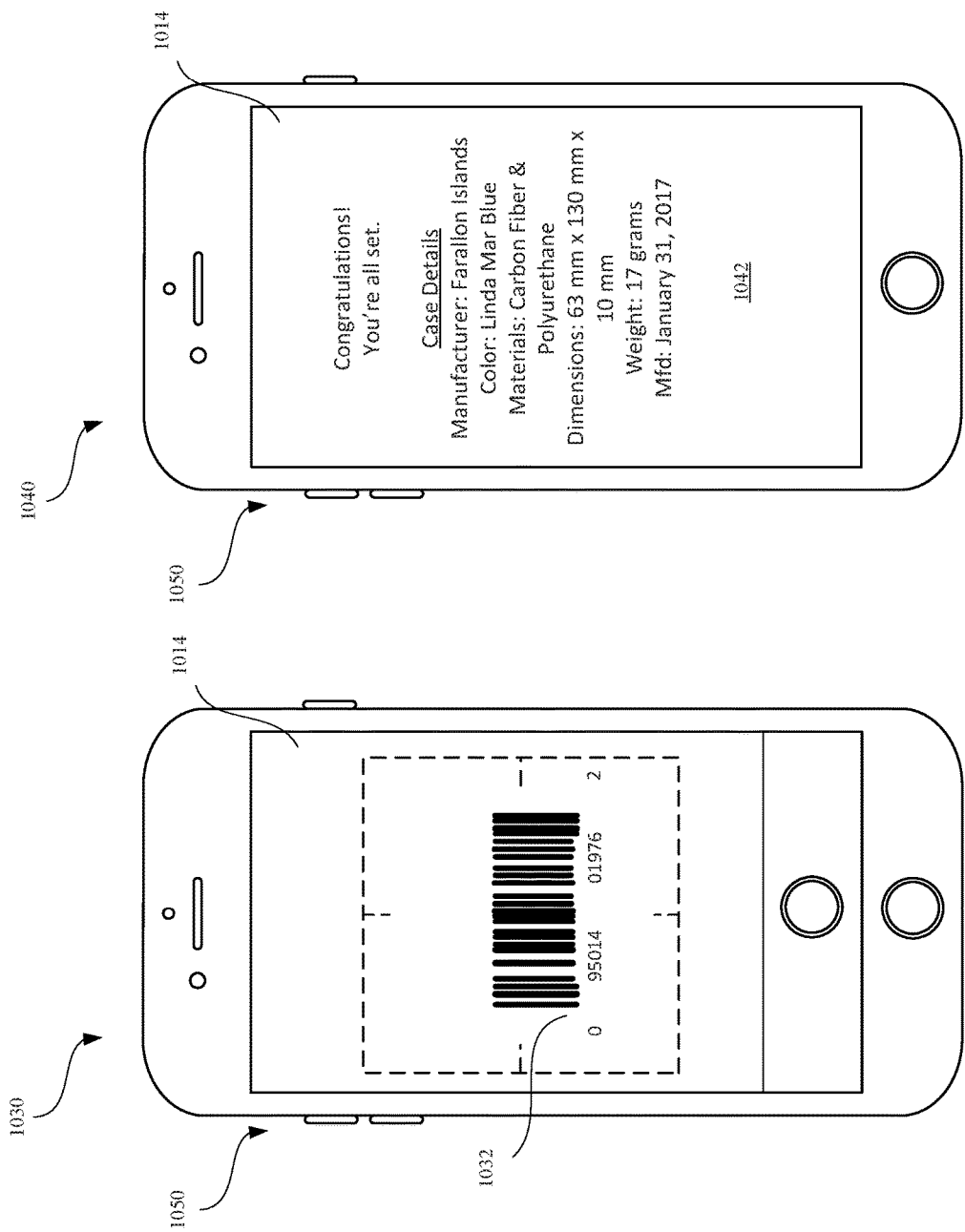

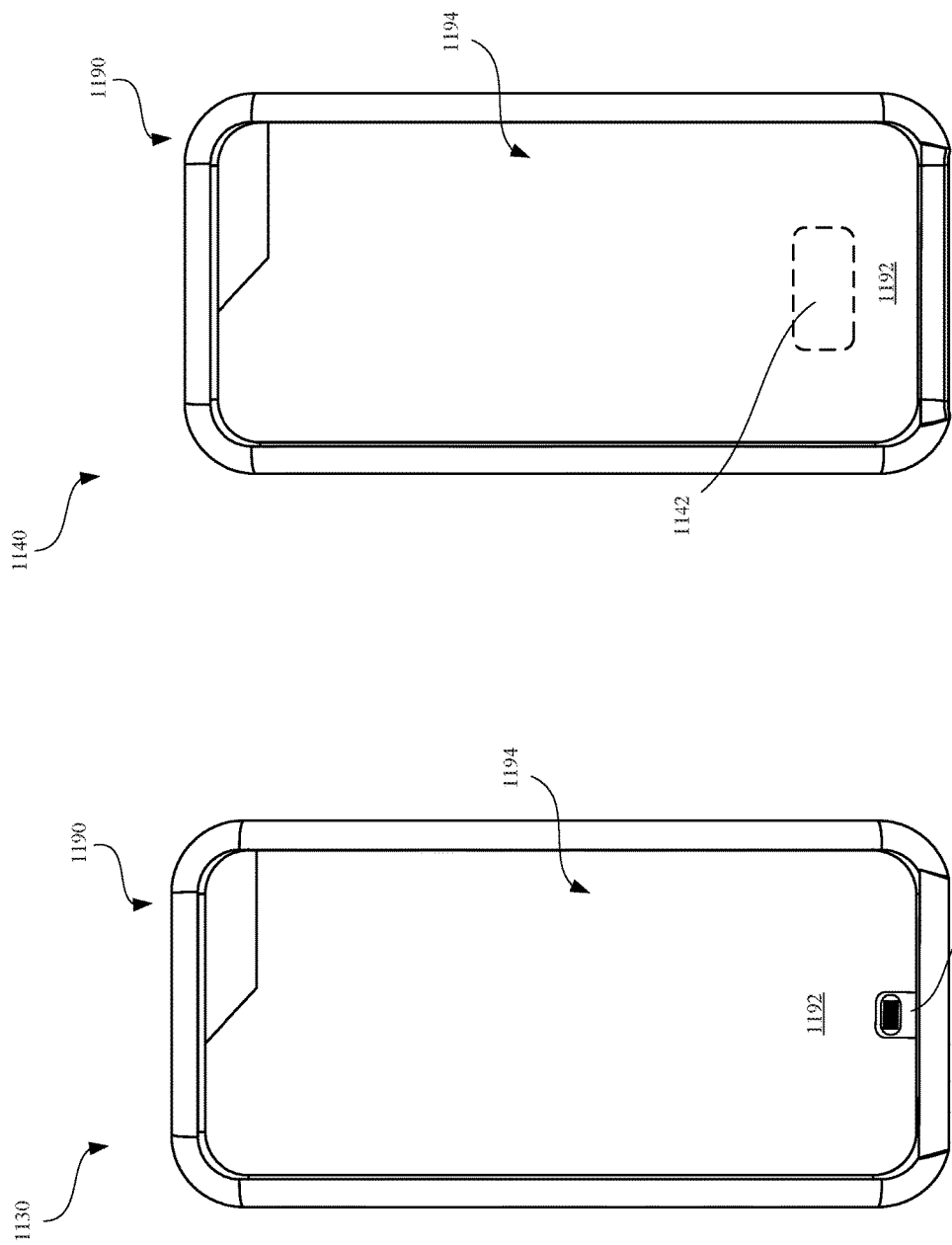

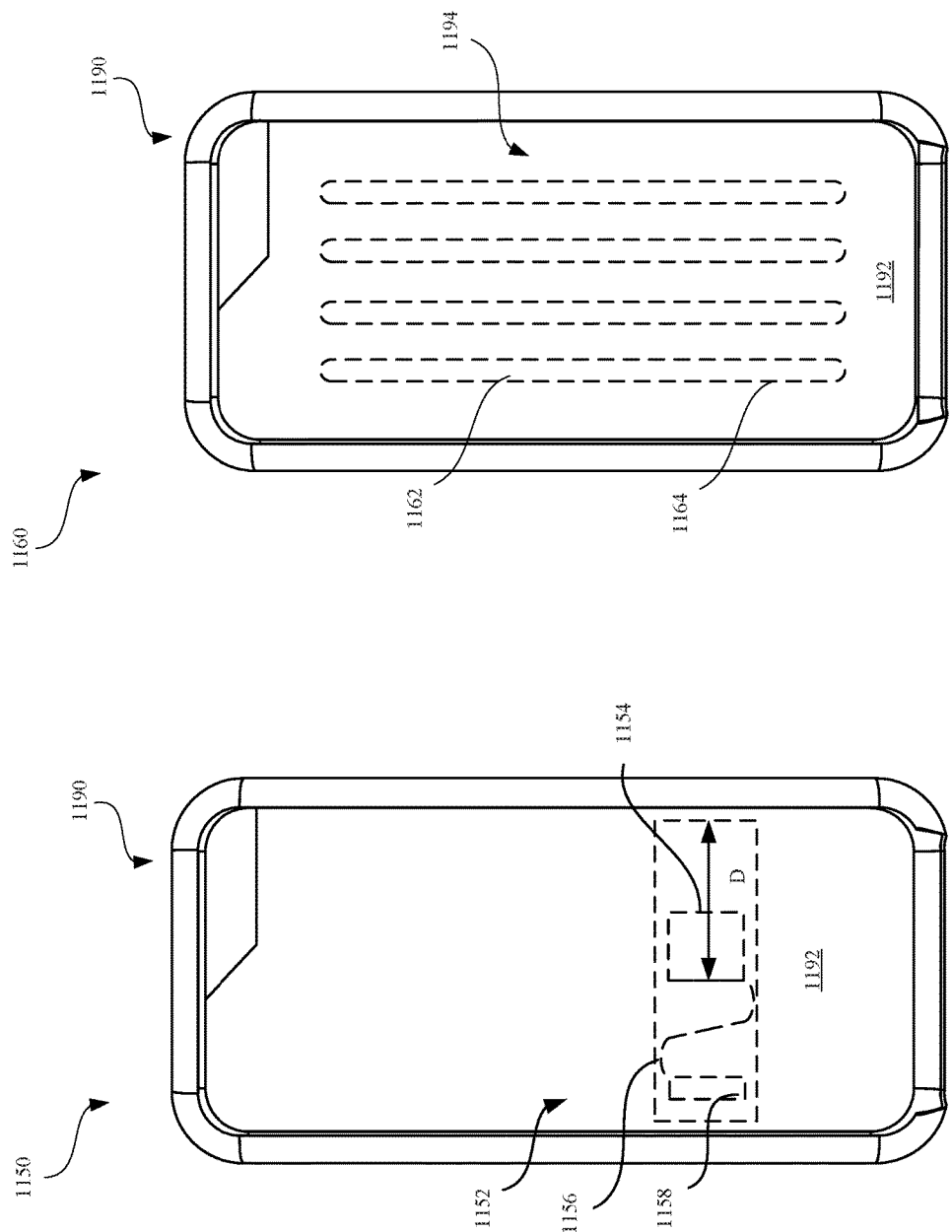

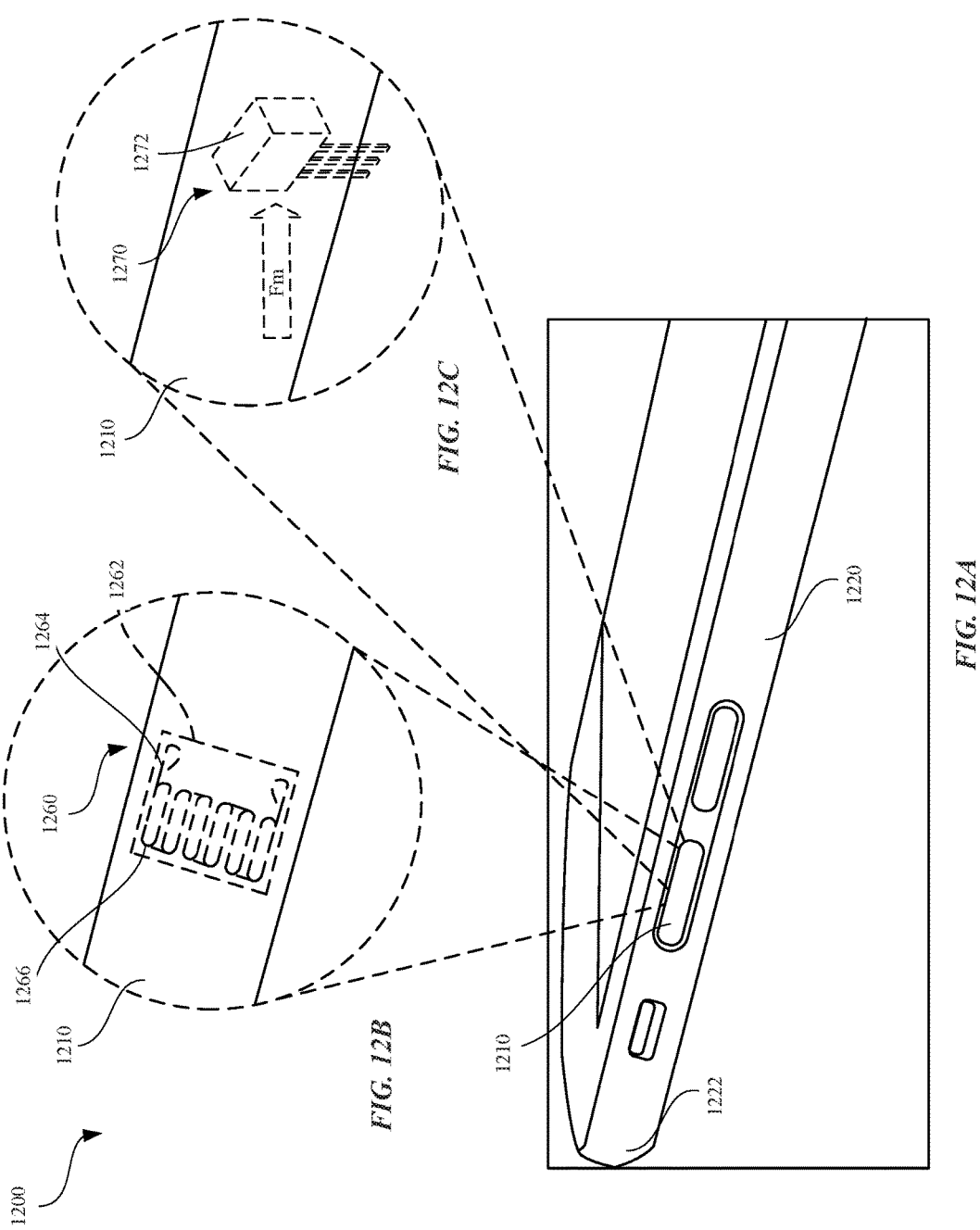

ALTERING FEEDBACK AT AN ELECTRONIC DEVICE BASED ON ENVIRONMENTAL AND DEVICE CONDITIONS

FIELD

The described embodiments relate to an electronic device that includes a feedback component. More specifically, the electronic device is configured to adjust an amount of feedback generated by the feedback component in conjunction with providing a notification.

BACKGROUND

Conventional portable electronic devices can include feedback components that are configured to generate feedback in conjunction with providing notifications. While generating such feedback is helpful to users, the feedback generated by such portable electronic devices is generally static and inflexible (i.e., incapable of adjusting to different conditions). Accordingly, there is a need for portable electronic devices to be capable of dynamically adjusting the amount of feedback that is generated based on a variety of different conditions.

SUMMARY

This paper describes various embodiments related to an electronic device that includes a feedback component. More specifically, the electronic device is configured to adjust an amount of feedback generated by the feedback component in conjunction with providing a notification.

In some embodiments, a portable electronic device is described. The portable electronic device can include a processor and a sensor coupled with the processor, the sensor capable of detecting a stimulus, and responding to the stimulus by providing a detection signal to the processor. The portable electronic device can further include an interface unit capable of interacting with a user. The portable electronic device can further include a feedback unit in communication with the interface unit and the processor, the feedback unit providing a feedback response that is perceptible to the user during the interaction, where when the sensor detects the stimulus, the detection signal provided to the processor by the sensor causes the processor to respond by instructing the feedback unit to alter the feedback response.

In some embodiments, a consumer product system is described. The consumer product system can include a portable electronic device that includes a processor, a sensor in communication with the processor, the sensor being capable of detecting an external magnetic field and responding by providing a detection signal to the processor, and a feedback component configured to generate a feedback response in communication with the processor and the sensor. The consumer product system can further include a case, a body having walls that define a recess, and a magnetic element embedded in at least one of the walls, the magnetic element providing a magnetic field that when detected by the sensor, (i) the sensor sends a signal to the processor indicating that the portable electronic device is being carried within the recess, and (ii) the processor responds to the signal by instructing the feedback component to alter the feedback response, accordingly.

In some embodiments, a method for generating feedback at an electronic device is described. In response to detecting a press event at an interface unit of the electronic device, the method includes receiving a detection signal from a sensor when the sensor detects a stimulus that is present while detecting the press event. The method further includes instructing a feedback unit of the electronic device to alter an initial feedback response associated with the press event to form an altered feedback response that is based on the stimulus.

The described embodiments may be better understood by reference to the following description and the accompanying drawings. Additionally, advantages of the described embodiments may be better understood by reference to the following description and accompanying drawings.

BRIEF DESCRIPTION OF THE DRAWINGS

The included drawings are for illustrative purposes and serve only to provide examples of possible structures and arrangements for the disclosed inventive apparatuses and methods for their application to computing devices. These drawings in no way limit any changes in form and detail that can be made to the embodiments by one skilled in the art without departing from the spirit and scope of the embodiments. The embodiments will be readily understood by the following detailed description in conjunction with the accompanying drawings, wherein like reference numerals designate like structural elements.

FIGS. 10A-10D illustrate conceptual diagrams for obtaining properties of a case by a portable electronic device, according to some embodiments.

FIGS. 11A-11F illustrate various examples of cases capable of carrying portable electronic devices, in accordance with some embodiments.

FIGS. 12A-12C illustrate perspective views of a portable electronic device that is configured to detect an amount of strain exerted against an I/O component, in accordance with some embodiments.

Figure 1:
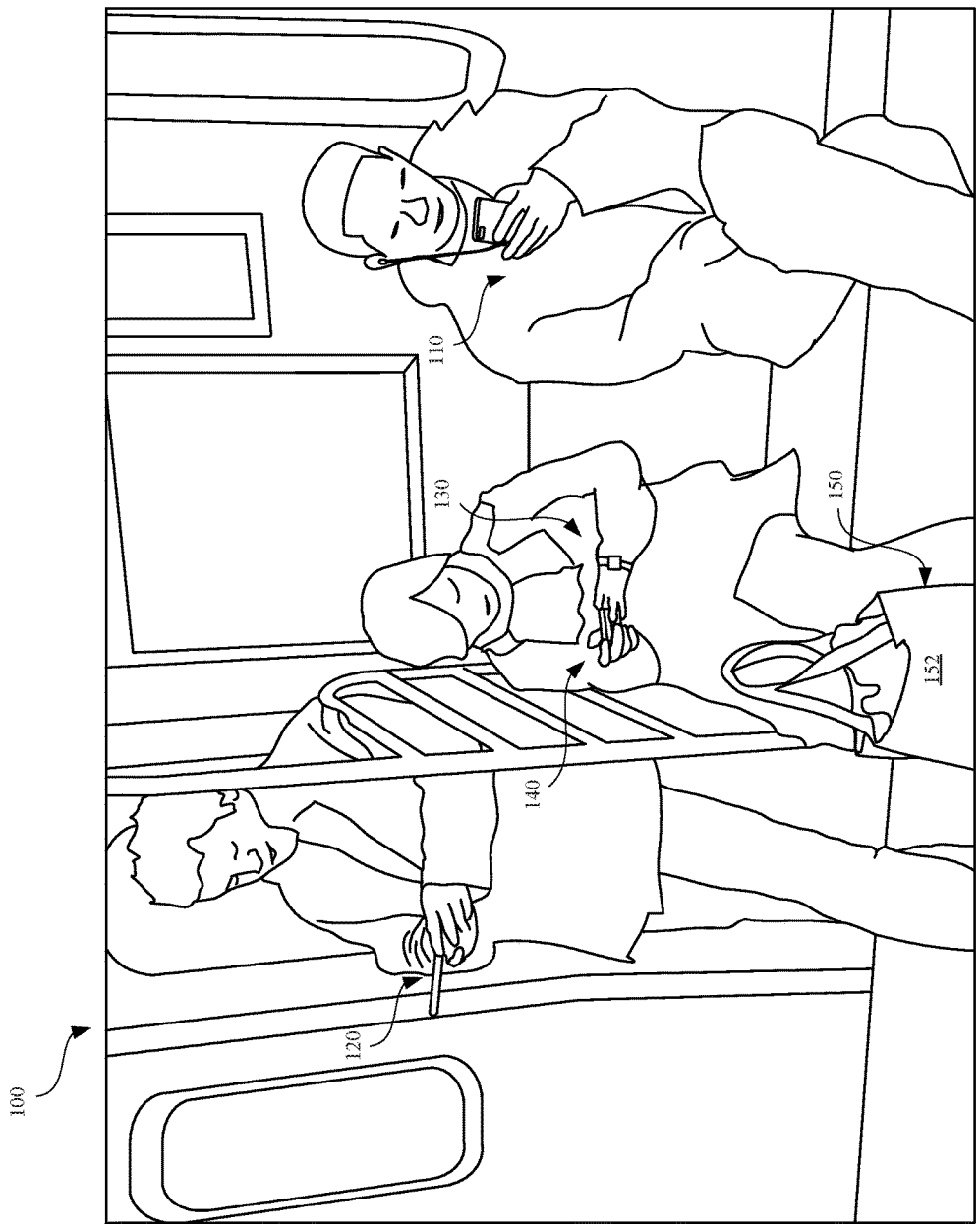
FIG. 1 illustrates a perspective view of a number of different portable electronic devices that are capable of adjusting an amount of feedback that is generated in conjunction with providing a notification, in accordance with some embodiments.

Those skilled in the art will appreciate and understand that, according to common practice, various features of the drawings discussed below are not necessarily drawn to scale, and that dimensions of various features and elements of the drawings may be expanded or reduced to more clearly illustrate the embodiments of the present invention described herein.

DETAILED DESCRIPTION

The following disclosure describes various embodiments for altering an amount of feedback at a portable electronic device. Certain details are set forth in the following description and figures to provide a thorough understanding of various embodiments of the present technology. Moreover, various features, structures, and/or characteristics of the present technology can be combined in other suitable structures and environments. In other instances, well-known structures, materials, operations, and/or systems are not shown or described in detail in the following disclosure to avoid unnecessarily obscuring the description of the various embodiments of the technology. Those of ordinary skill in the art will recognize, however, that the present technology can be practiced without one or more of the details set forth herein, or with other structures, methods, components, and so forth.

Electronic devices can include electronic displays to provide visual feedback while also increasing the functionality of these electronic devices. Additionally, many electronic devices include feedback components, such as haptic feedback components and acoustic feedback components. Providing different types of feedback that can be perceived by more of the user's different senses (e.g., sight, touch, sound) can provide for an overall improved user experience. However, users may also desire for more of an individualized user experience, as the feedback components in conventional electronic devices are unable to alter the amount of feedback generated to compensate for different contexts, such as environmental conditions and device conditions. Therefore, although users may find feedback components desirable for increasing the user experience, such users may also find such feedback intrusive, unsatisfying, or undesirable when generated during the wrong contexts or inappropriate situations. In such circumstances, the use of feedback components can actually detract from the user experience.

Additionally, there is a need for electronic devices to apply machine learning algorithms to learn from user behavior and preferences. Furthermore, as electronic devices become more sophisticated, they can include different types of sensors. Thus, techniques are described herein to enable electronic devices to detect general surroundings. One example of a surrounding that can be detected using the techniques described herein is a protective case that carries the electronic device. By taking into consideration these factors in conjunction with generating feedback, the electronic device can improve the overall user experience.

As used herein, the term "environmental conditions" generally refers to external environmental factors related to the surroundings of the electronic device. While the environmental conditions may not directly affect the operation or function of the electronic components of the electronic device, such environmental conditions can affect the user's perception of feedback generated at the electronic device. In some examples, even when the electronic device is functioning at a nominal operating level, the environmental conditions can affect the user's perception of the feedback that is generated at the electronic device.

As used herein, the term "device conditions" generally refers to factors at the electronic device level that affect the operation or functionality of the electronic components of the electronic device. In some examples, the device conditions can affect the electronic device's ability to function at a nominal operating level, and therefore, affect the user's perception of the feedback that is generated. In some embodiments, any combination of the environmental conditions or device conditions can be referred to as operational circumstances or operational conditions.

As described herein, the term "notification" generally refers to a type of predetermined electrical signal that is generated by the electronic device in response to a user-initiated request or a device-initiated request. For example, depressing a volume button included along a housing of the electronic device can be associated with a user-initiated request to increase the volume (type of electrical signal) of the electronic device. In another example, receiving a text message via a software program established at the electronic device can be associated with a device-initiated request to communicate with the user.

As described herein, the term "haptic feedback" can generally refer to stimulation of the nerves within the user's appendages. Haptic feedback can simulate a sensation of touch by applying force, vibrations, or motions that can be perceived by the user. The feedback components are capable of generating electrostatic signals that can penetrate a housing of the electronic device to stimulate the nerves.

As described herein, the term "acoustic feedback" can be used interchangeably with "audible feedback." The term "acoustic feedback" can refer to generating sound waves that can be perceived by humans, where the sound waves have a frequency range of between about 20 Hz to about 20,000 Hz. Additionally, a frequency range greater than or less than the human hearing range is contemplated by the various embodiments described herein. In some examples, a single feedback component can be capable of generating acoustic feedback and haptic feedback in at least one of a concurrent, overlapping, continuous, serial, or simultaneous manner.

In various embodiments, the electronic device can include a housing that includes an electronic component for providing a notification. The housing can carry a sensor capable of detecting an operating condition that is present in conjunction with receiving a request to provide the notification, where the sensor provides a control signal associated with the operating condition. The housing can further include a controller configured to receive the request to provide the notification, where the notification is associated with an initial feedback characteristic, and in response to receiving the control signal, the initial feedback characteristic can be adjusted to form an adjusted feedback characteristic based on the operating condition. The housing can further include a feedback component for generating the adjusted feedback characteristic in conjunction with the electronic component providing the notification.

The various embodiments set forth herein are provided to adjust the amount of feedback that is generated in accordance with environmental and device conditions. Exemplary electronic devices that include haptic and acoustic feedback components can include, but are not limited to, portable computing devices, laptops, smartphones, smartwatches, mobile devices, consumer devices, wearable electronic devices, tablet computers, and the like.

The foregoing provides various electronic devices capable of adjusting or altering an amount of feedback. A more detailed discussion of these electronic devices is set forth below and described with reference to FIGS. 1-19, which illustrates detailed diagrams of devices and components that can be used to implement these techniques and features.

FIG. 1 illustrates an perspective view 100 of a number of different portable electronic devices that are capable of adjusting an amount of feedback that is generated in conjunction with providing a notification, in accordance with some embodiments. FIG. 1 illustrates a number of different portable electronic devices 110, 120, 130, 140, and 150 that are each being utilized by users in different contexts while in a moving subway car. The moving subway car is associated with different environmental conditions, such as ambient sounds, vibrations, and rapid changes in movement. These different environmental conditions can affect each of the users' overall enjoyment while utilizing their respective portable electronic devices 110, 120, 130, 140, and 150. In some examples, each of the portable electronic devices 110, 120, 130, 140, and 150 can detect the repetitive vibrations generated by movement of the subway car running across a track.

In some examples, FIG. 1 illustrates a user dozing off while listening to music that is playing from his smartphone 110. While dozing off, the user suddenly receives an important text message from his boss. To compensate for the different environmental conditions present in the subway car, the smartphone 110 can adjust the amount of feedback that is generated in conjunction with providing the notification, such as by adjusting the feedback generated by a haptic feedback component and an acoustic feedback component.

In another example, FIG. 1 illustrates another user feverishly drafting a work e-mail on his tablet computer 120. A proximity sensor (not illustrated) of the tablet computer 120 detects that the user is in contact with the tablet computer 120. Additionally, machine learning algorithm of the tablet computer 120 detects based on recency of interaction (i.e., temporal proximity) that the tablet computer 120 is presently in the user's hands, e.g., user recent interaction with an I/O component of the tablet computer 120 in the last 1-5 seconds. Thus, when the tablet computer 120 provides a notification of a top-priority work e-mail, the tablet computer 120 is not required to generate a loud audible alert. Indeed, the low frequency sounds associated with the repetitive vibrations of the moving subway car may mask any loud audible alert generated. Neither is the tablet computer 120 required to generate a large amount of haptic feedback since the tablet computer 120 is aware that the user is presently focused on the graphical user interface (GUI) of the tablet computer 120. Thus, the tablet computer 120 can simply provide a visual alert of the top-priority work e-mail.

In another example, FIG. 1 illustrates another user with multiple portable electronic devices in her possession, including a smartwatch 130 that is worn on her wrist, a smartphone 140 that is held in her hands, and a portable computer 150 that is in her purse 152. Each of the electronic devices 130, 140, 150 can generate a different amount of feedback in conjunction with providing a notification. For example, the portable computer 150 can utilize a combination of a proximity sensor, a force sensor, an ambient light sensor, and the like to determine that the portable computer 150 is stowed away in the user's purse 152. Thus, the portable computer 150 can prevent or refrain from generating haptic feedback events, as they may be of little value to the user who cannot readily perceive such haptic feedback events. However, the portable computer 150 can generate an acoustic feedback event (e.g., loud ringing noise) that can sufficiently be distinguished by the user from the ambient noise within the moving subway car in order to catch the user's attention as to the notification. Additionally, the smartphone 140 can utilize a combination of at least one of a proximity sensor, a force sensor, an ambient light sensor, machine learning algorithm, capacitive sensing, and the like to determine that the user is presently focused on the GUI of the smartphone 140. Thus, the smartphone 140 can prevent haptic feedback from being otherwise generated, since the smartphone 140 is aware that a simple visual alert will be sufficient to catch the user's attention. Alternatively, the smartwatch 130 can utilize a combination of at least one of a proximity sensor, a force sensor, an ambient light sensor, machine learning algorithm, capacitive sensing, and the like to determine that the user is not presently focused on the smartwatch 130. Thus, the smartwatch 130 can generate a haptic feedback event to notify the user of a daily exercise goal with sufficient amount of haptic feedback capable of catching the user's attention in context of the different environmental conditions that are present.

Referring again to the user with the smartwatch 130, the smartphone 140, and the portable computer 150, each of these devices can be capable of detecting and differentiating between static forces and dynamic forces. In one example, the portable computer 150 that is stowed away in the user's purse 152 may merely detect static forces since the portable computer 150 is not being actively moved while in the moving subway car. Alternatively, the smartphone 140 can detect dynamic forces due to constantly changing angular orientation, strain exerted by the user's fingers against the smartphone 140 housing, strain exerted by the user's fingers against a case of the smartphone 140. The static and dynamic forces that are detected by these portable electronic devices 130, 140, 150 can be further considered in adjusting the type and/or amount of feedback that is generated in conjunction with providing a notification.

The portable electronic devices 110, 120, 130, 140, and 150 can be capable of dynamically adjusting the type (e.g., haptic feedback, visual feedback, acoustic feedback), as well as the amount of feedback (e.g., intensity of feedback) to adjust for different environmental conditions, as well as device conditions as discussed in more detail with reference to FIGS. 3-4.

In some embodiments, the portable electronic devices 110, 120, 130, 140, and 150 can adjust the amount of feedback generated in order to conserve system resources, battery life, and the like.

In some embodiments, the portable electronic devices 110, 120, 130, 140, and 150 can be capable of adjusting the amount of feedback that is generated in conjunction with providing a notification such that the amount of feedback that is actually perceived by the user is unaltered regardless of the environmental and/or device conditions. In this manner, the portable electronic devices 110, 120, 130, 140, and 150 can maintain a consistent user experience regardless of the environmental and/or device conditions.

The portable electronic devices 110, 120, 130, 140, and 150 described herein can refer to multimedia devices, smartphones, mobile phones, mobile devices, music players, smartwatches, laptops, tablet computers, portable computing devices, portable computers, consumer devices, and the like.

Figure 2:
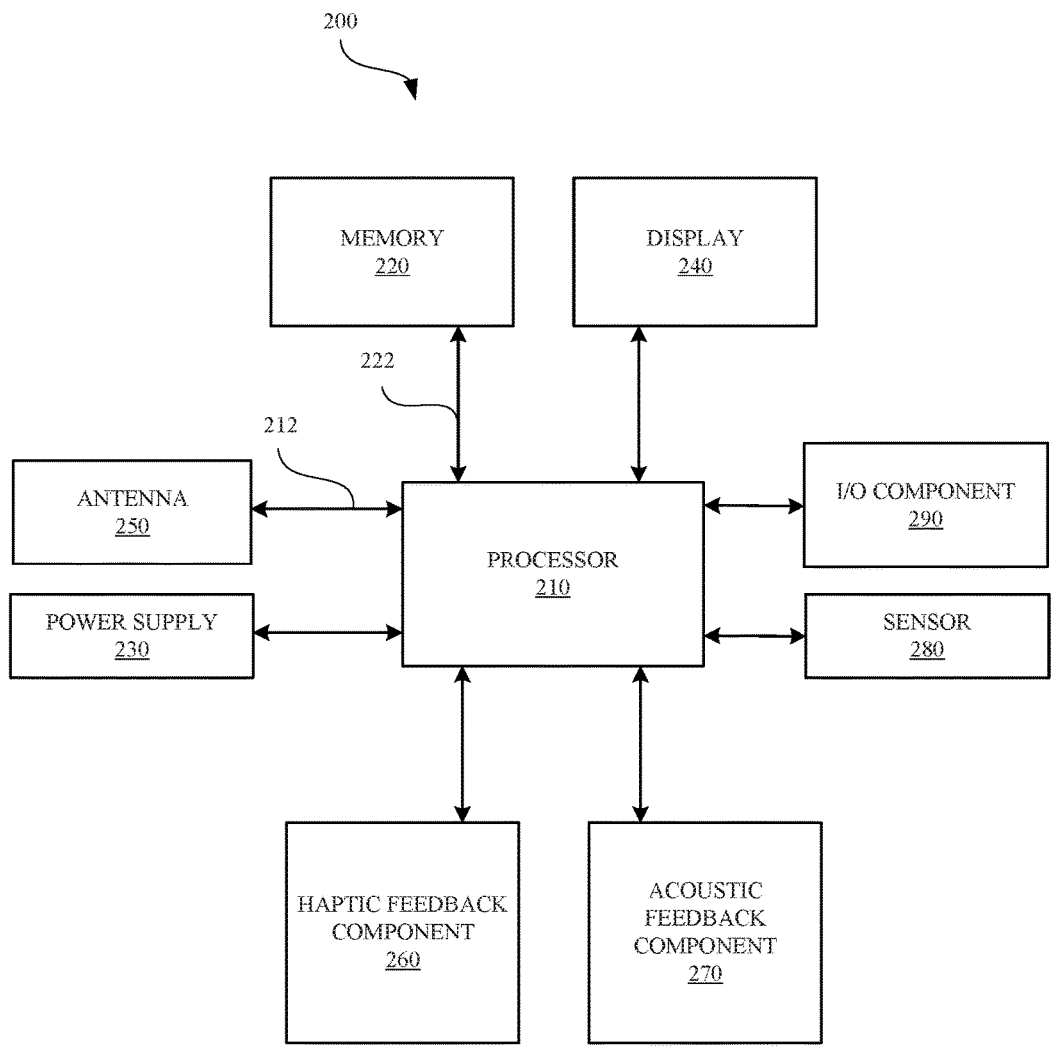
FIG. 2 illustrates a block diagram of a portable electronic device that can be used to implement the various techniques described herein, according to some embodiments.

FIG. 2 illustrates a block diagram of a portable electronic device 200 that can be used to implement the various techniques described herein, according to some embodiments. As shown in FIG. 2, the portable electronic device 200 includes one or more processors 210 for controlling the overall operation of the portable electronic device 200. The one or more processors 210 can refer to microcontrollers for performed dedicated functions or a central processing unit (CPU). The portable electronic device 200 includes a memory 220, which can comprise a single disk or multiple disks (e.g., hard drives), and includes a storage management module that manages one or more partitions within the memory 220. In some embodiments, the memory 220 can include flash memory, semiconductor (solid state) memory or the like. The portable electronic device 200 can also include a Random Access Memory (RAM) and a Read-Only Memory (ROM). The ROM can store programs, utilities or processes to be executed in a non-volatile manner. The RAM can provide volatile data storage, and stores instructions related to the operation of the portable electronic device 200. In some embodiments, the memory 220 refers to a non-transitory computer readable medium, where an operating system (OS) is established at the memory 220 that is configured to execute applications or software programs that are stored at the memory 220, such as the ROM. In some embodiments, a data bus 222 can facilitate data transfer between the memory 220 and the processor 210.

In some embodiments, the portable electronic device 200 includes an antenna 250. A network/bus interface 212 can couple the antenna 250 to the processor 210. The antenna 250 can communicate with other electronic devices via any number of wired or wireless communication protocols, including at least one of a global network (e.g., the Internet), a wide area network, a local area network, a wireless personal area network (WPAN), and the like. In some examples, the antenna 250 can transmit data to the other electronic devices over IEEE 802.11 (e.g., a Wi-Fi® networking system), Bluetooth (IEEE 802.15.1), ZigBee, Wireless USB, Near-Field Communication (NFC), a cellular network system (e.g., a 3G/4G/5G network such as UMTS, LTE, etc.), and the like.

In some embodiments, the portable electronic device 200 includes a display subsystem for displaying information on a display 240, which can include a display driver and the display 240, such as a liquid-crystal display, light-emitting diode display, a multi-touch touchscreen, etc. In some embodiments, the multi-touch touchscreen can be referred to as an I/O component 290. In some embodiments, the I/O components 290 are separate from the multi-touch touchscreen.

In some embodiments, the portable electronic device 200 includes one or more I/O components 290, such as buttons, switches, or the multi-touch touchscreen. In some embodiments, the I/O components 290 can be interchangeably referred to as an interface unit. In some examples, the I/O component 290 can refer to a solid state switch relay that can be configured to detect a change in capacitance when a user's appendage makes contact with a surface of the multi-touch touchscreen. The I/O component 290 can be configured to generate an electrical signal (e.g., current) that corresponds to the change in capacitance, whereupon the electrical signal is provided to the processor 210. In some embodiments, an A/D converter (not illustrated) can be configured to convert an analog signal of the electrical signal that is provided by the I/O component into a digital signal, such that the processor 210 can process the change in capacitance. In some examples, the I/O component 290 can refer to a pressure-sensitive substrate. The solid state switch relay can be configured to generate at least one of haptic feedback or acoustic feedback to cause the user to perceive that the solid state switch relay is a mechanical-actuated button. In this manner, the solid state switch relay can cause the processor 210 to generate at least one of haptic feedback or acoustic feedback that is based upon the change in capacitance that is detected.

In some embodiments, the I/O component 290 can refer to a switch having a mechanical actuator (e.g., spring-based button, slide-switch, rocker switch) or other moving parts that cause the switch to depress into a housing of the portable electronic device 200 when pushed down by the user's appendage. The sensation of depressing the I/O component 290 can be translated to the user's appendage, such that the user perceives some amount of strain or tactile effect.

In some embodiments, the I/O component 290 is a switch assembly that is configured to detect a press event triggered by the user. When the press event is triggered, the interface unit can provide a signal to the processor 210.

Additionally, the I/O component 290 can be associated with a requisite amount of activation force that must be satisfied in order to depress the I/O component 290 (i.e., press event) so as to cause an electrical signal to be generated by an electronic component (e.g., display 240, haptic feedback component 260, etc.) of the portable electronic device 200. In some examples, the activation force is between about 0.1 N to about 25 N. In some examples, the amount of activation force that is required to depress the I/O component 290 in order to elicit an electrical signal can be adjusted by the processor 210 so as to compensate for different environmental and/or device conditions. Accordingly, techniques are described herein regarding adjusting the amount of activation force required to depress the I/O component 290 such that the user perceives generally the same amount of activation force that is required to depress the I/O component 290 regardless of the environmental and device conditions.

In some embodiments, the portable electronic device 200 includes at least one haptic feedback component 260 for generating one or more haptic events. In some examples, the haptic feedback component 260 is configured to generate haptic feedback in response to a user-initiated request. For example, the user can transmit a request for a user-initiated request for haptic feedback by depressing on the I/O component 290 for a predetermined duration in order to elicit an intelligent personal assistant and knowledge navigator, such as Siri®, to be activated. In another example, the user can transmit a request for a user-initiated request for haptic feedback by speaking into the portable electronic device via a microphone. In some examples, the haptic feedback component 260 is configured to generate haptic feedback in response to a device-initiated request. For example, the device-initiated request to generate haptic feedback can be received in conjunction with the processor 210 receiving a phone call or providing a calendar event alert. In some embodiments, the processor 210 can control the intensity or amount of the haptic feedback by adjusting an amplitude, frequency, pulse, or polarity of an electrical current that is transmitted from the power supply 230 to the haptic feedback component 260.

In some examples, the haptic feedback component 260 can refer to at least one of magnetic elements, piezoelectric elements, linear resonance actuators, electroactive substrates, displaceable mass, and the like. In some embodiments, the haptic feedback components 260 can be referred to as a taptic engine.

In some embodiments, the portable electronic device 200 includes at least one acoustic feedback component 270 for generating one or more acoustic events. In some examples, the acoustic feedback component 270 is configured to generate acoustic feedback in response to a user-initiated request and a device-initiated request. In some examples, the acoustic feedback component 270 can refer to speakers, voice coils, magnetic resonance tubes or elements, and the like. In some embodiments, the processor 210 can control the intensity or amount of the acoustic feedback by adjusting an amplitude, frequency, pulse, or polarity of an electrical current that is transmitted from the power supply 230 to the acoustic feedback component 270.

In some embodiments, the haptic feedback components 260 and acoustic feedback components 270 can be activated individually, simultaneously, overlapping, concurrently, continuously, or in sequence to generate at least one of haptic or acoustic feedback in conjunction with providing a notification. In some embodiments, the haptic and acoustic feedback components 260, 270 can refer to a same component (e.g., magnetic elements).

In some embodiments, the portable electronic device 200 includes at least one sensor 280 for determining at least one stimulus, such as environmental conditions or context that are present in the portable electronic device's surroundings or general environment. The sensor 280 can refer to at least one of a light sensor, a proximity sensor, an accelerometer, a strain gage, a capacitive sensor, a Hall effect sensor, a force sensor, a magnetometer, a gyroscope, a compass, a barometer, an IR light detector, a load cell, a magnetometer, microphones, pedometers, thermometer, linear acceleration, fingerprint sensor, and the like. In some embodiments, the sensor 280 and the processor 210 can communicate with one another to establish a feedback loop for generating haptic and/or acoustic feedback, as discussed in more detail with reference to FIGS. 4-5. In some embodiments, the sensor 280 can generate a detection signal in response to detecting the at least one stimulus. The detection signal can be subsequently provided to the processor 210.

In some embodiments, the sensor is configured to detect for static and dynamic forces. As described herein, the term static force refers to an amount of constant force that is applied to a stationary object, while the term dynamic force is associated with motion or movement of an object.

In some embodiments, the sensor 280 is integrated with the I/O component 290. For example, a strain gage can be incorporated with the I/O component 290, as shown in FIGS. 12A-12C. In this manner, the strain gage can detect an amount of strain that is exerted against the button and/or the housing of the portable electronic device 200. For example, the strain gage can determine foreign objects (e.g., housing of a case) that are touching the I/O component 290 and exerting strain against the I/O component 290. In some embodiments, the sensor 280 can be incorporated at regions of a housing of the portable electronic device 200 that are most prone to come into contact with another object, such as the corners of the housing.

In some embodiments, the processor 210 is configured to generate haptic feedback parameters or values that correspond to the amount of haptic feedback that is to be generated by the haptic feedback component 260, while the processor 210 is configured to generate acoustic feedback parameters or values that correspond to the amount of acoustic feedback that is to be generated by the acoustic feedback component 270. For example, in conjunction with receiving an electrical signal from the sensor 280, the processor 210 includes a control logic component that is configured to generate a haptic feedback parameter. The haptic feedback parameter can specify an amount of input voltage to be provided to the haptic feedback component 260 from the power supply 230. The amount of input voltage that is generated by the power supply 230 can be proportional to the change in electric current that is detected at the sensor 280. The amount by which the haptic feedback component 260 oscillates can be proportional to the amount of input voltage. Similar techniques can apply to the acoustic feedback component 270.

Figure 3:
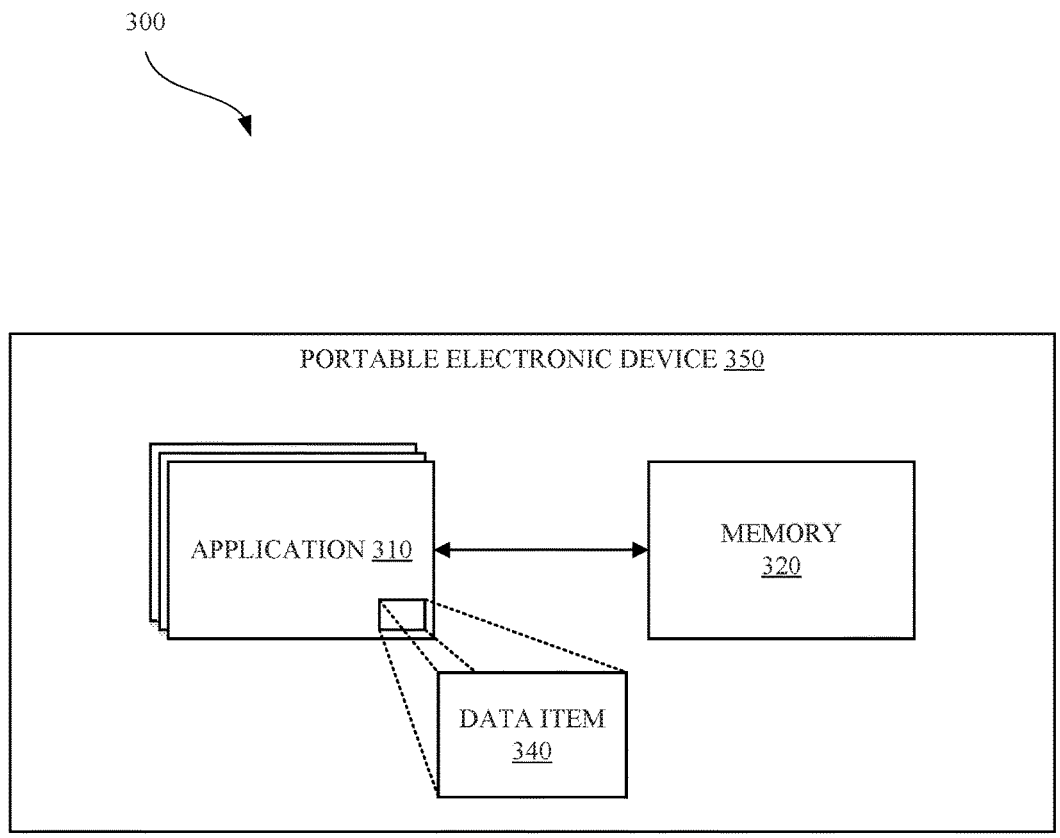
FIG. 3 illustrates a high-level overview of a system that can be configured to implement the various techniques described herein, according to some embodiments.

FIG. 3 illustrates a high-level overview of a system 300 that can be configured to implement the various techniques described herein, according to some embodiments. The system 300 includes a portable electronic device 350. According to some embodiments, the portable electronic device 350 can be configured to execute (e.g., via an operating system established at the memory 220) various programs or software applications 310. In one example, the application 310 can refer to a program for executing a feedback loop mechanism between at least the processor 210, the memory 220, the sensor 280, and the haptic and/or acoustic feedback components 260, 270. In some embodiments, the feedback loop can refer to an open feedback loop or a closed feedback loop. The application 310 can manage feedback generated by the haptic or acoustic feedback components 260, 270 according to at least one of environmental conditions or device conditions. In some embodiments, the memory 320 includes a data item 340 managed by the application 310. In some examples, the data item 340 can refer to specific environmental conditions or device conditions that are monitored and recorded by the application 310. Additionally, the data item 340 can specify specific sub-conditions that more particularly describe or categorize the environmental conditions and/or device conditions that are to be monitored. The application 310 can request the data item 340 from the memory 320 in conjunction with the processor 210 executing the application 310.

Figure 4:
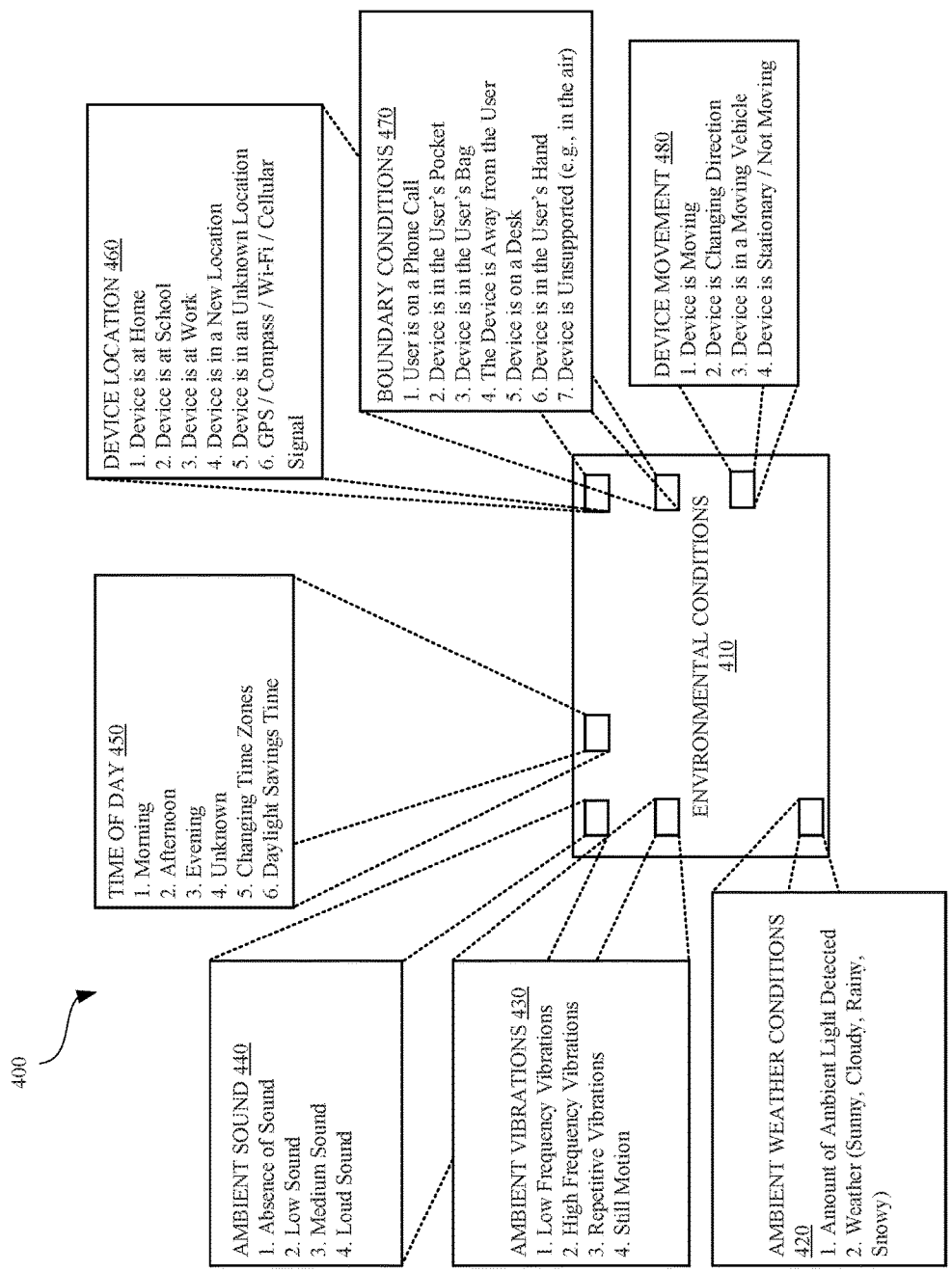
FIG. 4 illustrates a system of an exemplary list of environmental conditions that are configured to be monitored by the portable electronic device, according to some embodiments.

FIG. 4 illustrates a system 400 of an exemplary list of environmental conditions 410 that are configured to be detected by the portable electronic device 200, according to some embodiments. In some embodiments, any of the environmental conditions 410 included in the exemplary list can be utilized by the processor 210 in adjusting the amount of haptic and/or acoustic feedback that is generated in conjunction with providing a notification. In some embodiments, the exemplary list of environmental conditions 410 are stored in the data item 340, and can be executed by the processor 210. As shown in FIG. 4, the exemplary list of environmental conditions 410 includes "Ambient Weather Conditions" 420, "Ambient Vibrations" 430, "Ambient Sound" 440, "Time of Day" 450, "Device Location" 460, "Boundary Conditions" 470, and "Device Movement" 480.

The sensor 280 can detect for any one of these environmental conditions 410, and subsequently provide an electrical signal to the processor 210 informing of the environmental conditions 410 that are detected. As a result, the processor 210 is configured to adjust an amount of feedback generated by at least one of the haptic or acoustic feedback components 260, 270 in conjunction with providing a notification. In some embodiments, the processor 210 detects environmental conditions 410 that are present when the processor 210 receives a device or user-initiated request to provide a notification. In some embodiments, the environmental conditions can refer to immediate surroundings (e.g., within 1 meter of the portable electronic device 200), general surroundings (e.g., within 10 meters of the portable electronic device 200), or geographical surroundings (e.g., greater than 10 meters of the portable electronic device 200).

In some examples, the portable electronic device 200 detects for "Device Movement" 480 by utilizing the sensor 280, which refer to an accelerometer and/or a gyroscope. Device movement can refer to vibrations, shifts in orientation, acceleration, and the like, such as those experienced in a subway car shown in FIG. 1. In some examples, the portable electronic device 200 detects for "Ambient Sound" 440 by utilizing the sensor 280, which refers to a microphone. The microphone can detect ambient sound, e.g., nearby conversations, wheels of the subway making contact with the rails, and the like.

In some examples, the portable electronic device 200 detects for "Boundary Conditions" 490 by utilizing the sensor 280 (e.g., receiving detection signal from the sensor 280). In some examples, sensors 280 such as strain gages, proximity sensors, inertial sensors, accelerometers, and the like can be utilized to detect for boundary conditions. Boundary conditions can generally refer to the manner in which the portable electronic device 200 is being supported. In some examples, the boundary conditions can refer to determining whether the portable electronic device 200 is in the user's pocket or in the user's hand. In some examples, the boundary conditions can refer to determine that the portable electronic device 200 is sitting statically at a surface of a table. In some examples, the boundary conditions can refer to determining that the portable electronic device 200 is floating in space (e.g., when thrown in the air). In some examples, the boundary conditions can refer to determining that the portable electronic device 200 is being held tightly by a user's hand or that an amount of pressure/strain is being exerted against the housing of the portable electronic device 200.

The processor 210 can adjust the type of acoustic and/or haptic feedback that is generated according to the type of boundary conditions that are present. In some examples, the processor 210 can determine that generating haptic feedback while the portable electronic device 200 is floating in space may be of no utility to a user who cannot physically perceive the vibratory or tactile feedback. In some examples, the processor 210 can determine that generating haptic feedback while the portable electronic device 200 is lying statically on a table may also be of little utility since the user cannot physically perceive the feedback. Additionally, generating haptic feedback against the table may generate an annoying or unpleasant sound. In some examples, if the processor 210 determines that the user is gripping or holding the portable electronic device 200 tightly, the processor 210 can instruct the haptic feedback component 260 to lower the amount of haptic feedback that would normally be generated since the user will be more sensitive to any vibratory or tactile feedback that is generated.

In some examples, by detecting whether the portable electronic device 200 is positioned close to the user, the processor 210 can adjust the output volume of the acoustic feedback component 270 below a preset volume (e.g., 80 dB) of a ringtone associated with an incoming phone call to an adjusted volume (e.g., 60 dB). In this manner, the processor 210 can utilize the "Boundary Conditions" 490 to adjust the ringtone to prevent a loud and obtrusive ringtone from startling the user.

In some embodiments, each of the different types of environmental conditions 410 that are detected can be considered in combination by the processor 210. In some examples, the portable electronic device 200 detects for "Device Location" 460 by utilizing the sensor 280, which refers to a Global Positioning Satellite (GPS) system. For example, the GPS can establish that the portable electronic device 200 is located in a school classroom. The application 310 can store within the memory 220 knowledge that in the school classroom, the user has previously turned the smartphone from "Normal" operating mode to a "Silent" mode (i.e., disables audible alerts). Thus, the processor 210 can utilize this knowledge to preemptively prevent any acoustic feedback from being generated while the smartphone is located at school regardless if the smartphone is presently switched to "Silent" mode. Additionally, another sensor 280 (e.g., microphone) of the portable electronic device 200 can detect for "Ambient Sound" 440. If the microphone also detects a low amount of sound (e.g., 15 dB), then the processor 210 can prevent any acoustic and haptic feedback from being generated when the smartphone receives a text message, in effect, enabling the smartphone to function in a manner similar to a "Do Not Disturb" mode (i.e., disables audible alerts and vibratory alerts).

Figure 5:
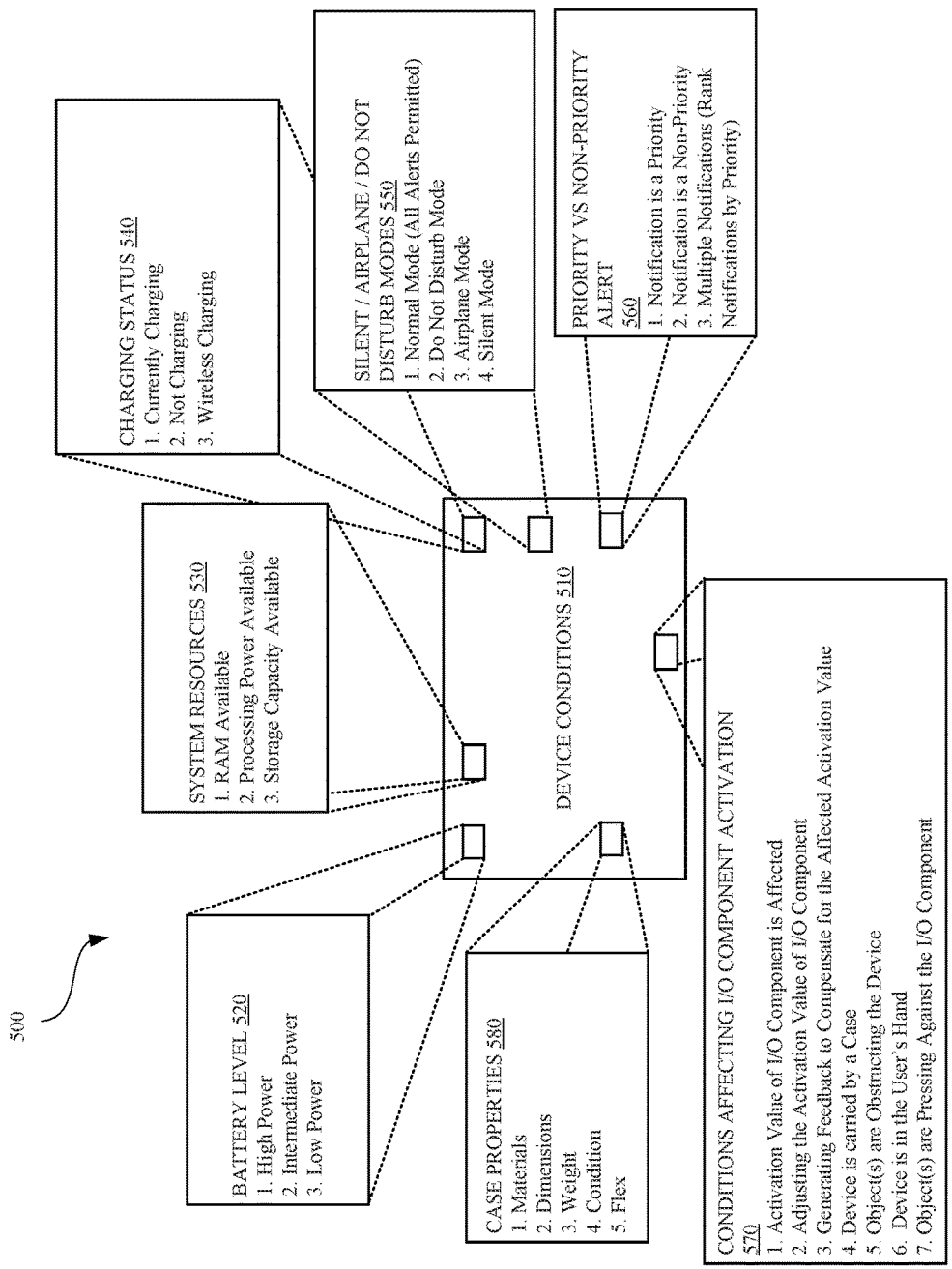
FIG. 5 illustrates a system of an exemplary list of device conditions that are configured to be monitored by the portable electronic device, according to some embodiments.

FIG. 5 illustrates a system 500 of an exemplary list of device conditions 510 that are configured to be detected by the portable electronic device 200, according to some embodiments. In some embodiments, any of the device conditions 510 included in the exemplary list can be utilized by the processor 210 in adjusting the amount of haptic and/or acoustic feedback that is generated in conjunction with providing a notification. In some embodiments, the exemplary list of device conditions 510 are stored in the data item 340, and can be executed by the processor 210. As shown in FIG. 5, the exemplary list of device conditions 510 includes "Battery Level" 520, "System Resources" 530, "Charging Status" 540, "Silent/Airplane/Do Not Disturb Modes" 550, "Priority vs. Non-Priority Alert" 560, "Conditions Affecting I/O Component Activation" 570, and "Case Properties" 580.

As described herein, device conditions 510 refer to general conditions that can affect the operation or functionality of the various electronic components of the portable electronic device 200, such as the processor 210, memory 220, haptic feedback component 260, acoustic feedback component 270, and the I/O component 290. In some embodiments, the processor 210 establishes a feedback loop (e.g., closed or open) with the electronic components by recording events or device conditions into the memory 220.

In some embodiments, the memory 220 can maintain a continuous log of "System Resources" 530 that have been expended or are currently being expended in order to execute the functionalities of the portable electronic device 200. System resources can refer to processing power, available RAM, available memory, and the like that remains following the execution of the one or more functions. In one example, while the user is playing a game on the portable electronic device 200, the processor 210 can determine that about 500 MB of RAM is required to play the game, which leaves about 1.5 GB of available RAM to perform other tasks. Thus, the application 310 can deprioritize system functions that are associated with high memory usage, such as generating a large haptic feedback event in conjunction with providing a notification. Alternatively, to reduce the amount of RAM that is utilized, the processor 210 can reduce the intensity of the haptic feedback event or alternatively, cause an acoustic event to be generated instead.

In some examples, the portable electronic device 200 detects for "Battery Level" 520. For example, the battery life of the power supply 230 can affect the amount of energy that can be provided to the haptic feedback component 260. If the processor 210 determines that the power supply 230 has 10% of battery life remaining, then the processor 210 can deprioritize systems functions associated with a large amount of energy usage, such as generating haptic feedback events.

In some examples, the portable electronic device 200 detects for "Conditions Affecting I/O Component Activation" 570, by utilizing the sensor 280, such as a strain gage or Hall effect sensor. When an amount of strain is exerted against the I/O component 290, the strain can obstruct the actuation of the I/O component 290, therefore, affecting its ability to cause an electrical signal to be generated. In one example, the strain gage can be incorporated with the I/O component 290 to precisely measure the amount of strain that is exerted against the I/O component 290, such as by a housing of a case that touches the I/O component 290. In some examples, the strain exerted against the I/O component 290 can affect the amount of activation force that is required to depress the I/O component 290. For example, if the I/O component 290 requires a baseline activation force (e.g., 10 N), the processor 210 can adjust the amount of activation force required to depress the I/O component 290 to an adjusted activation force (e.g., 7 N) to compensate for the strain exerted on the I/O component 290. A specific example for detecting "Conditions Affecting I/O Component Activation" 570 is described in more detail with reference to FIGS. 12A-12C.

In some examples, the portable electronic device 200 detects for "Priority vs. Non-Priority Alert" 560. For example, when the processor 210 receives a request to provide a notification associated with an incoming phone call, the processor 210 can adjust the amount of feedback associated with the notification corresponding to the relative priority of the person calling the user. Specifically, when an incoming phone call is received, the processor 210 executing the application 310 can (1) identify the caller associated with the phone call, and (2) reference the user's memory 220 to determine the importance of the caller. For example, while the user is in the middle of a lunch meeting, the processor 210 receives an incoming phone call from Cameron, who is identified in the user's contacts list as a high-priority contact. Thus, the processor 210 can dynamically increase the baseline amount of acoustic feedback associated with an incoming phone call notification (e.g., 60 dB) to be elevated to an adjusted volume of about 80 dB. Alternatively, while the user is just preparing to swim out for an enjoyable surfing session, the user may receive an incoming phone call from his ex-girlfriend, in the user's contacts list as a low-priority contact. Thus, the processor 210 can dynamically decrease the baseline amount of acoustic feedback associated with an incoming phone call notification (e.g., 60 dB) to register in "Silent" mode.

In some embodiments, the application 310 as executed by the processor 210 can dynamically learn the user's preferences over a period of time, and subsequently build up the user's priority vs. non-priority contact list and relative rankings through a machine learning algorithm.

In some embodiments, the application 310 as executed by the processor 210 is capable of adjusting the amount of feedback to be generated in combination with environmental and device conditions. In one example, the processor 210 can combine electrical signals associated with the environmental conditions and the device conditions in order to generate a combined feedback parameter. Additionally, the application 310 can be configured to assign an amount of weight to each environmental conditions and/or device conditions. For example, the application 310 may assign more weight to device conditions than environmental conditions when the "Battery Level" 520 indicates that battery life of the portable electronic device 200 is less than 20%, and that conserving battery life is more important to providing notifications.

Although FIGS. 4-5 describe various embodiments of determining conditions in conjunction with adjusting an amount of haptic and/or acoustic feedback that is generated by the portable electronic device 200, it should be noted that the processor 210 can utilize the conditions to adjust other general settings of the portable electronic device 200 to adjust camera settings, camera flash settings, display settings, and the like. In one example, if the processor 210 determines that the "Battery Level" 520 is low (e.g., less than 10%), then the processor 210 can automatically lower the brightness of the display settings of the display 240 in order to conserve power.

Figure 6:
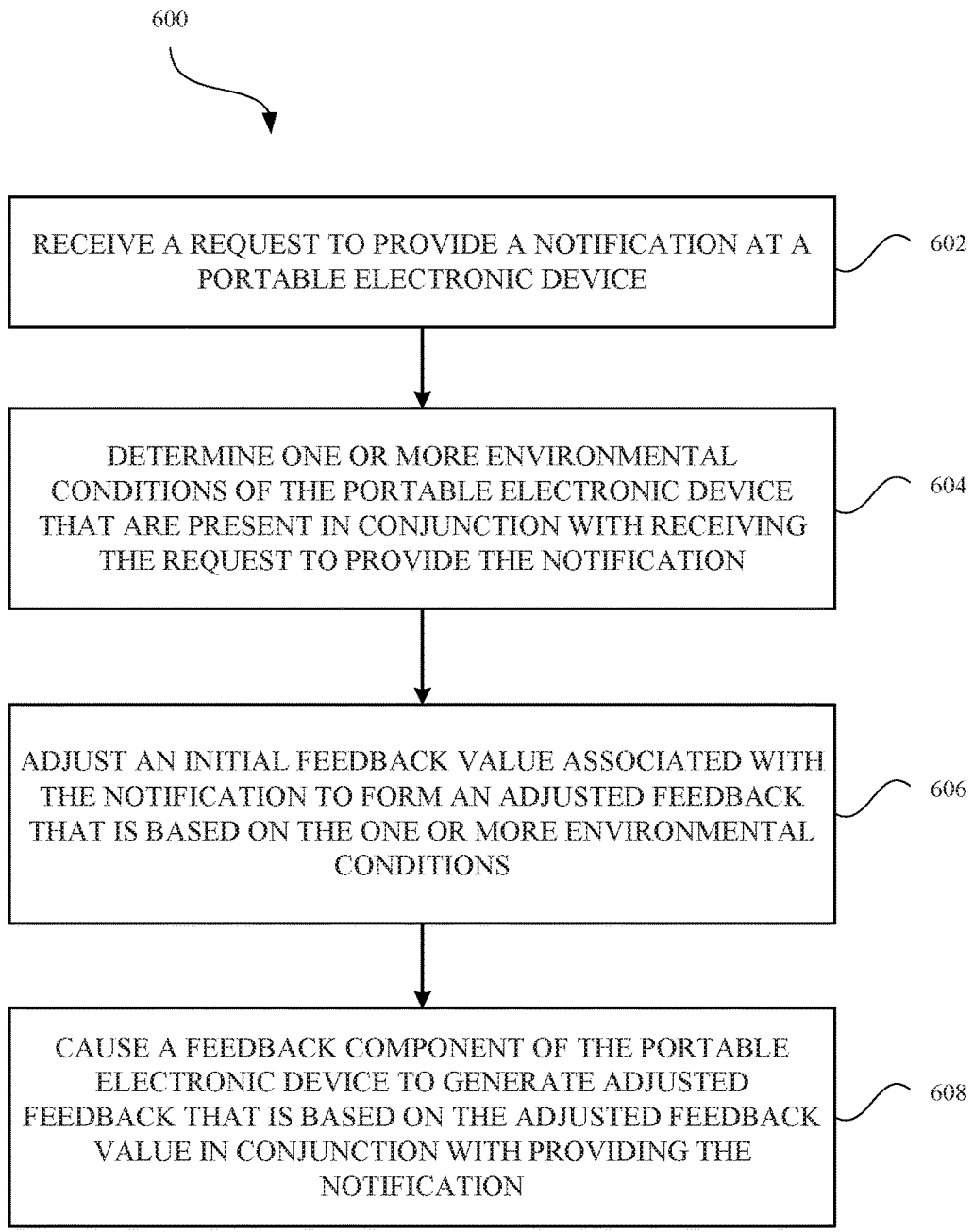
FIG. 6 illustrates a method for adjusting feedback that is generated by a feedback component in conjunction with providing a notification at a portable electronic device, according to some embodiments.

FIG. 6 illustrates a method 600 for adjusting an amount of feedback that is generated by a feedback component in conjunction with providing a notification at a portable electronic device, according to some embodiments. As shown in FIG. 6, the method 600 begins at step 602, where the processor 210 of the portable electronic device 200 receives a request to provide a notification at the portable electronic device 200. In some examples, the notification can refer to at least one of a device-generated request or a user-initiated request. At step 604, the processor 210 can determine one or more environmental conditions of the portable electronic device 200 that are present in conjunction with receiving the request to provide the notification. At step 606, the processor 210 can adjust an initial feedback value associated with the notification to form an adjusted feedback value in accordance with the one or more environmental conditions. For example, the processor can adjust an amplitude, frequency, duration, or oscillation of the acoustic feedback parameter. At step 608, the processor 210 can cause the haptic and/or acoustic feedback components 260, 270 to generate adjusted feedback based on the adjusted feedback value, in conjunction with the processor 210 providing the notification. For example, the processor 210 can adjust the amount of acoustic feedback associated with an incoming phone call notification (e.g., 60 dB) to an adjusted volume of about 80 dB.

Figure 7:
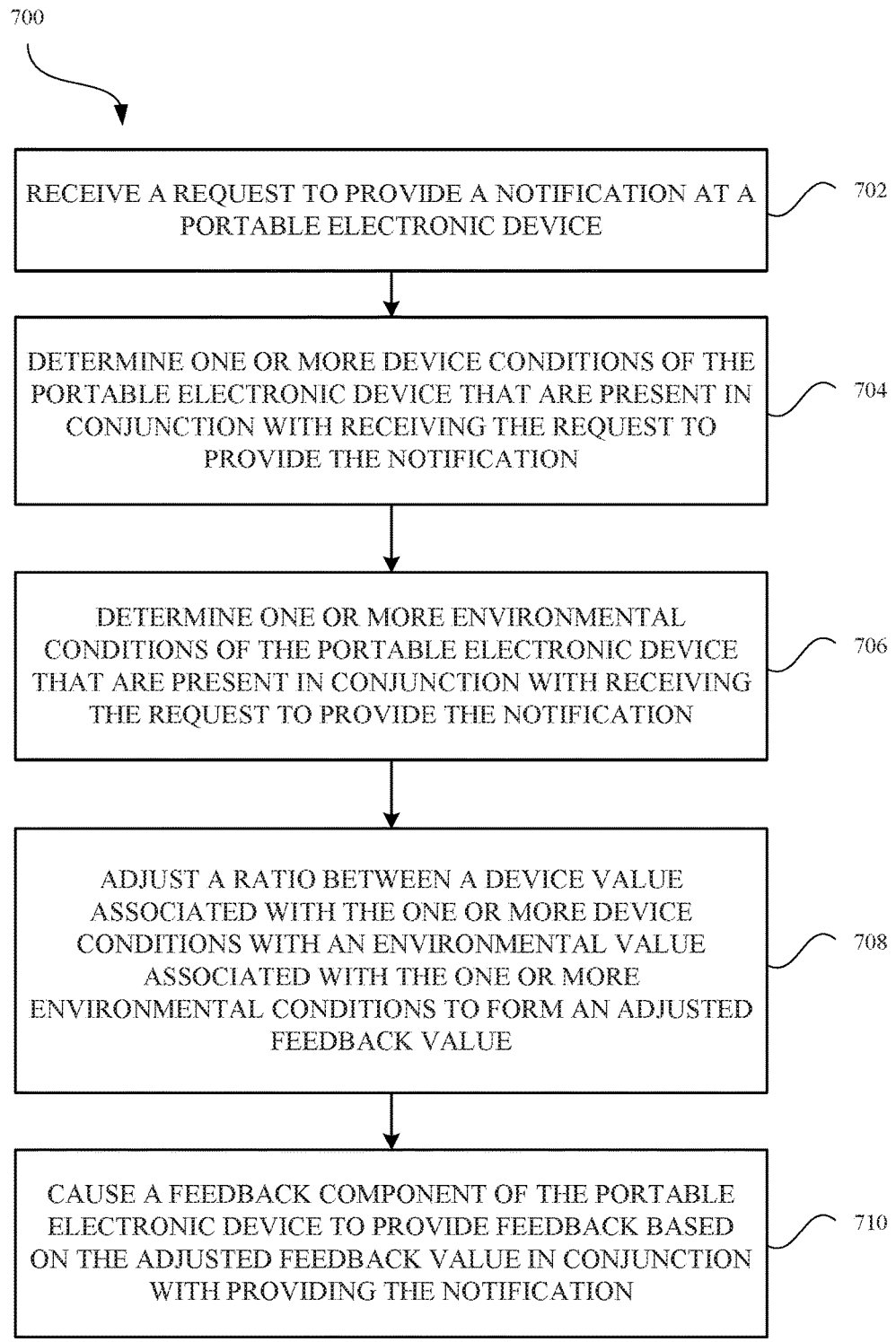
FIG. 7 illustrates a method for adjusting feedback in conjunction with providing a notification at a portable electronic device, according to some embodiments.

FIG. 7 illustrates a method 700 for adjusting an amount of feedback that is generated by a feedback component in conjunction with providing a notification at a portable electronic device, according to some embodiments. As shown in FIG. 7, the method 700 begins at step 702, where the processor 210 of the portable electronic device 200 receives a request to provide a notification. In some examples, the notification can refer to at least one of a device-generated request or a user-initiated request. At step 704, the processor 210 can determine one or more device conditions of the portable electronic device 200 that are present in conjunction with the processor 210 receiving the request to provide the notification. At step 706, the processor 210 can determine one or more environmental conditions of the portable electronic device 200 that are present in conjunction with the processor 210 receiving the request to provide the notification. At step 706, the processor 210 can adjust a ratio between a device value associated with the one or more device conditions with an environmental value associated with the one or more environmental conditions to form an adjusted feedback value. In some examples, the device value and the environmental value are weighted values that represent a balance of a ratio between device and environmental conditions. In some examples, the device value represents an amount of weight assigned to the device conditions, while the environmental value represents an amount of weight assigned to the environmental conditions. At step 708, the processor 210 can cause at least one of the haptic or acoustic feedback components 260, 270 of the portable electronic device 200 to generate adjusted feedback according to the adjusted feedback value in conjunction with providing the notification.

Figure 8:
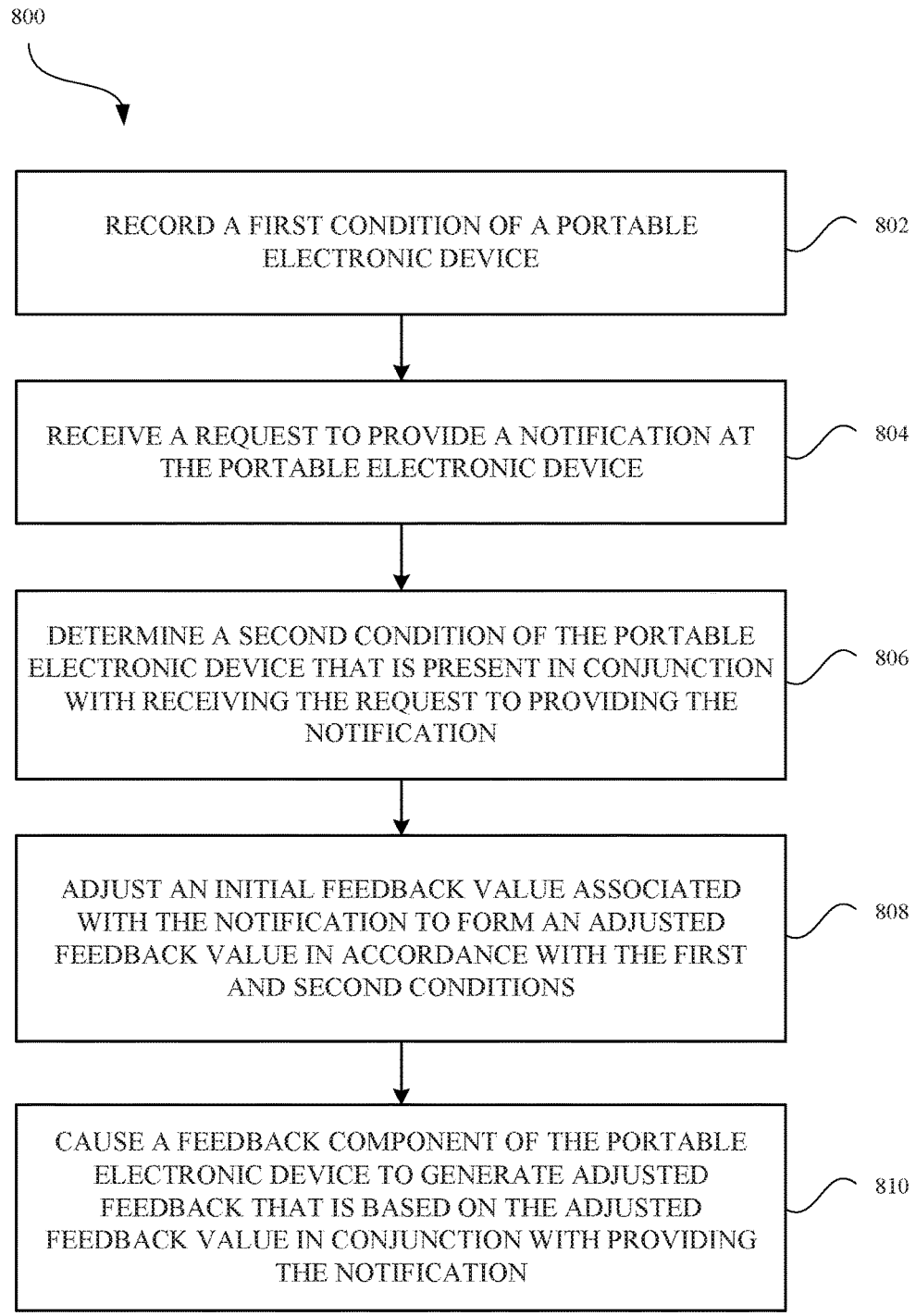
FIG. 8 illustrates a method for adjusting feedback that is generated by a feedback component of a portable electronic device in conjunction with providing a notification, according to some embodiments.

FIG. 8 illustrates a method 800 for adjusting an amount of feedback that is generated by a feedback component in conjunction with providing a notification at a portable electronic device, according to some embodiments. As shown in FIG. 8, the method 800 begins at step 802, where the processor 210 records a first environmental or device condition at the memory 220. In some examples, any number of environmental or device conditions can be recorded in memory 220. At step 804, the processor 210 can receive a request to provide a notification at the portable electronic device 200. In some examples, the notification can refer to at least one of a device-generated request or a user-initiated request. At step 806, the processor 210 can determine a second environmental or device condition that is present in conjunction with receiving the request to provide the notification. At step 808, the processor 210 can adjust an initial feedback value associated with the notification to form an adjusted feedback value in accordance with the first and second conditions. At step 810, the processor 210 can cause at least one of the haptic or acoustic feedback components 260, 270 to generate adjusted feedback according to the adjusted feedback value in conjunction with providing the notification.

In contrast to FIG. 7, the method 800 illustrates techniques for storing environmental or device conditions that occurred prior to the processor 210 receiving the request to provide the notification, and subsequently utilizing the environmental or device conditions for adjusting the amount of feedback that is provided. In this manner, the processor 210 can rely upon previous user behavior to dynamically generate adjusted feedback.

Figure 9:
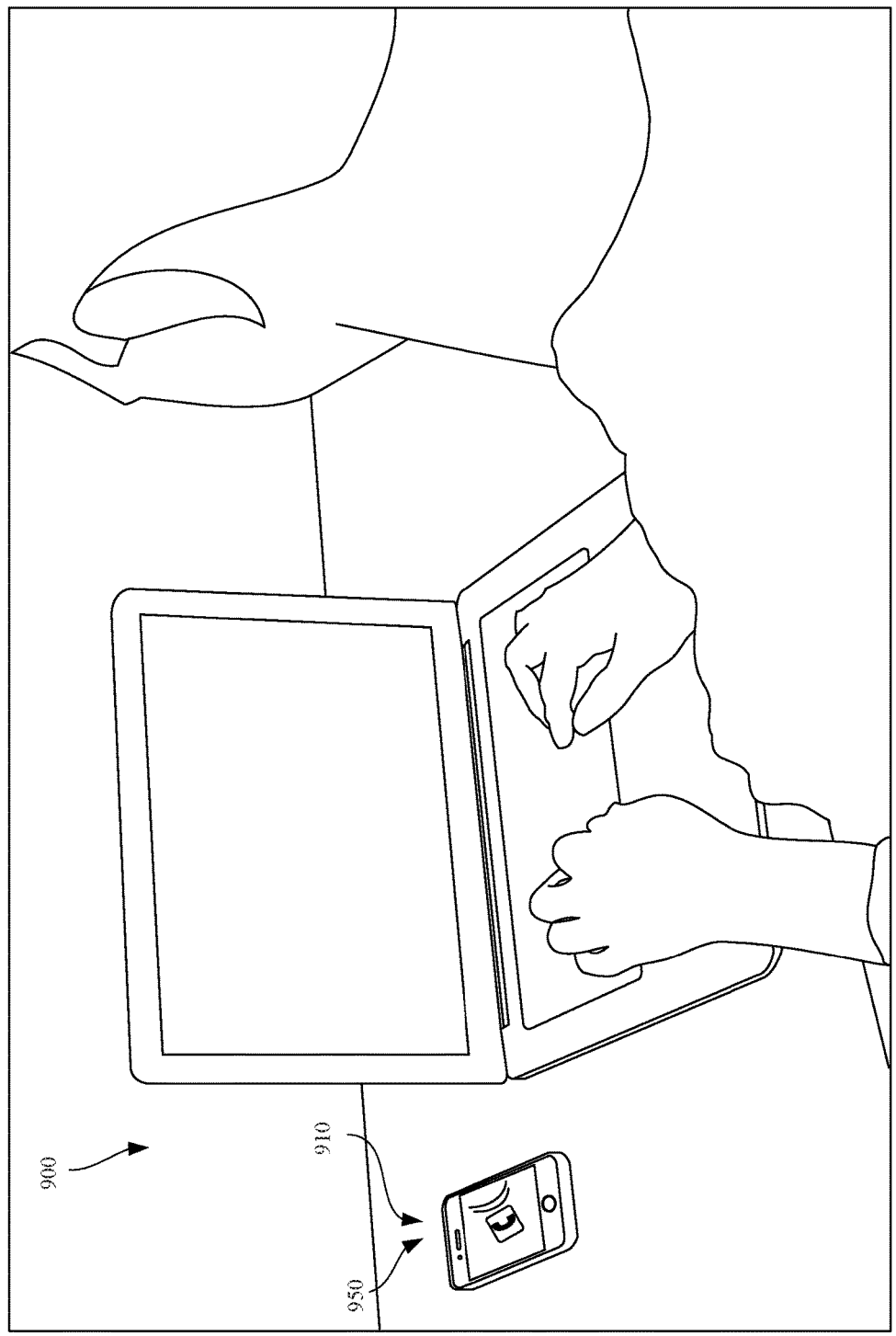
FIG. 9 illustrates a perspective view of a system for adjusting feedback at a portable electronic device that is carried by a case, according to some embodiments.

FIG. 9 illustrates a perspective view of a system 900 for adjusting feedback at a portable electronic device 910 that is carried by a case 950, according to some embodiments. As illustrated in FIG. 9, the portable electronic device 910 is carried within the case 950, and the portable electronic device 910 and the case 950 are shown laid across a surface of a desk in an engineering classroom. The case 950 has a size and dimensions that conform to the geometry of the portable electronic device 910 in order to provide a conforming fit. In some examples, the case 950 can be comprised of leather, silicone, polyurethane, or other deformable materials. Due to the materials that comprise the case 950, the portable electronic device 910 is adhered to the desk so that even when the portable electronic device 910 generates vibrations, these vibrations are largely absorbed by the desk. In this manner, the amount of vibrations as perceived by the user are muted or minimized because the oscillating motion of the haptic feedback component 260 (e.g., linear resonance actuator) is parallel to the surface of the desk or moving in plane. Instead energy associated with the haptic feedback response translates into dissipated energy, which can barely be perceived by the user. In some examples, the detection of the portable electronic device 910 laid across the surface of the desk is illustrative of a "Boundary Conditions" 470.

Additionally, materials such as polyurethane have a relatively low Young's Modulus value that allows for the case 950 to have a higher degree of flex than stiffer materials having a higher Young's Modulus value. The portable electronic device 910 can be configured to store properties of the case 950 at the memory 220. Material properties of the case can be stored in the exemplary list of "Case Properties" 580. Different techniques for obtaining the properties of the case are described in more detail with reference to FIGS. 10-11.

After determining the properties of the case, the properties can be stored at the memory 220. Subsequently, the processor 210 can adjust the amount of feedback generated by the acoustic feedback component 970 (e.g., speaker) and the haptic feedback component 960 (e.g., linear resonance actuator) according to the properties of the case. Additionally, the portable electronic device 910 is further configured to monitor for environmental conditions and device conditions in adjusting the amount of feedback generated by the feedback components 960, 970.

Referring to FIG. 9, in one example, during an engineering lecture, the student's portable electronic device 910 receives a phone call. However, the portable electronic device 910 can be configured to adjust the amount of haptic and acoustic feedback that is generated to suit the environmental and device conditions that are present in conjunction with receiving the phone call. For example, the portable electronic device 910 can mute any acoustic feedback associated with providing a notification of the phone call. Additionally, the processor 210 of the portable electronic device 910 can prevent boosting the amount of haptic feedback that would otherwise be generated because the processor 210 is aware that any amount of boosted haptic feedback would be simply negated by the desk.

In another example, following the end of the lecture, the student may whisper into the microphone of the portable electronic device 910 to command the intelligent personal assistant and knowledge navigator to play back a voicemail associated with the missed phone call. In this example, the processor 210 can be aware based on a combination of recency usage (i.e., temporal proximity), location services, and lack of ambient noise that the user is in a quiet environment. Thus, the processor 210 can cause the intelligent personal assistant and knowledge navigator to provide confirmation and play back the voicemail at a speaking volume that is adjusted to compensate for the environmental and device conditions. In other words, the speaking volume of the intelligent personal assistant and knowledge navigator can match the quiet classroom environment.

FIGS. 10A-10D illustrate conceptual diagrams for obtaining properties of a case by a portable electronic device, according to some embodiments. FIG. 10A illustrates an exemplary view 1010 for executing an application to obtain properties of a case, in accordance with some embodiments. Upon executing the application at the portable electronic device 1050, a graphical user interface (GUI) 1014 presented at the display 1012 of the portable electronic device 1050 can instruct the user "Take a picture of the barcode included on the packaging of the case."

FIG. 10B illustrates an exemplary view 1020 of a packaging box 1022 for the case 1090, in accordance with some embodiments. The packaging box can include a case identifier 1024 that can be associated with the case 1090. In some embodiments, the case identifier 1024 can be included on the case 1090 instead of the packaging box 1022. The case identifier 1024 can refer to a barcode, QR code, or other serial number. The case identifier 1024 can facilitate the portable electronic device 1050 to determine the specific "Case Properties" 580. In some embodiments, each model of the case 1090 has standard case properties such as manufacturer, model, manufacture date, color, materials, and the like.

In some examples, the case identifier 1024 can describe specific manufacturing properties of the case 1090, such as manufacture date, condition, dimensions, Young's Modulus, electrical capacitance, and weight. In some examples, some case manufacturers measure each specific case prior to releasing the case to the public. Thus, any deviations or deformities in manufacturing the case 1090 can be recorded by the manufacturer.

FIG. 10C illustrates an exemplary view 1030 of the GUI 1014 of the portable electronic device 1050 in conjunction with capturing an image 1032 of the case identifier 1024 associated with the case 1090, in accordance with some embodiments. Upon obtaining the image 1032 of the case identifier 1024, the processor 210 can be configured to determine the properties of the case 1090. For example, the processor 210 executing the application 310 can transmit data associated with the case identifier 1024 to a database, where the database stores the specific properties of the case 1090. Thereafter, the processor 210 can receive the properties of the case 1090 from the database, which can be stored at the memory 220.

FIG. 10D illustrates an exemplary view 1040 of the GUI 1014 of the portable electronic device 1050 subsequent to receiving the properties for the case 1090, in accordance with some embodiments. In some examples, the GUI can confirm that the properties of the case 1090 are stored at the memory 220. In this manner, the processor 210 can utilize the properties of the case 1090 in conjunction with generating feedback while providing a notification.

Figure 11B:
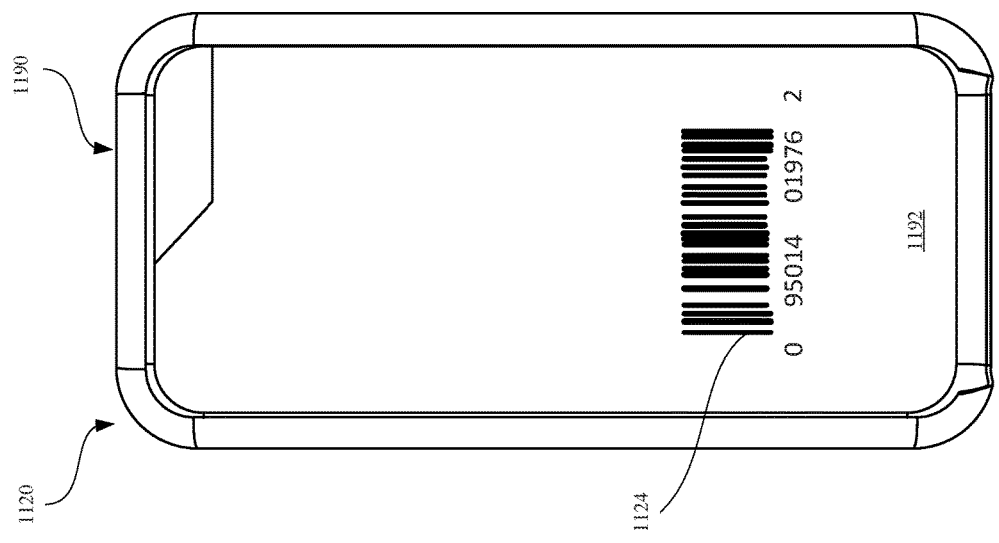
Figure 11A:
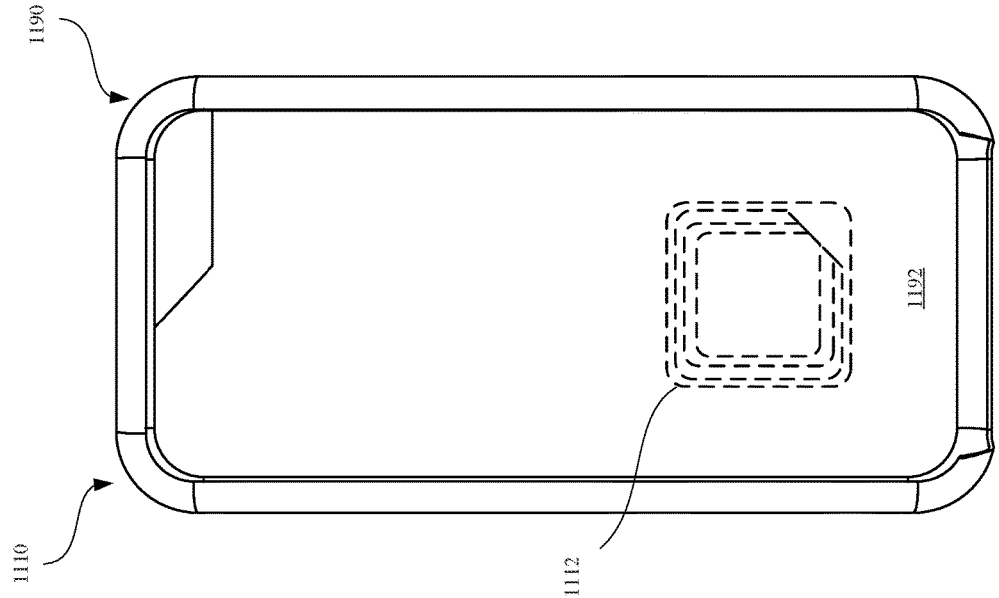

FIGS. 11A-11F illustrate various examples of cases capable of carrying portable electronic devices, in accordance with some embodiments. FIG. 11A illustrates an exemplary view 1110 of a case 1190 having a Radio-Frequency Identification chip or tag (RFID) 1112 that is embedded within a wall 1192 of the case 1190. In some examples, the RFID tag 1112 is exposed at an external surface of the wall 1192. In some embodiments, the RFID tag 1112 refers to a passive or active tag for collecting energy. In some examples, where the RFID tag 1112 refers to an active tag, the case 1190 can include a power supply for powering the RFID tag 1112, as will be described in more detail with reference to FIG. 17.

In some examples, the RFID tag 1112 can provide the properties that are associated with the case 1190. In some examples, the RFID tag 1112 includes an integrated circuit for storing and processing information, modulating and demodulating a radio-frequency signal, and collecting direct current power. Additionally, the RFID tag 1112 can include an antenna for receiving and transmitting the radio-frequency signal. In some embodiments, the portable electronic device 1050 can include an RFID reader that can be configured to demodulate the RF signal that is provided by the RFID tag 1112 in order to determine the properties of the case 1190.

FIG. 11B illustrates an exemplary view 1120 of a case 1190 having a case identifier 1124 that can be included on an external surface of the wall 1192 of the case. In some examples, the case identifier 1124 can be removably attached to the external surface of the wall 1192, such as a sticker. In other examples, the case identifier 1124 can be embedded or imprinted on the external surface of the wall 1192. The case identifier 1124 can be used by the portable electronic device 1050 to determine the specific properties of the case 1190, according to techniques described with reference to FIGS. 10A-10D.

In some embodiments, the case identifier 1124 can refer to reflective dots or retroreflective dots that are arranged in a specific pattern that is established by the manufacturer. The retroreflective dots can appear invisible in most conditions (i.e., non-detectable by the human eye). A flash module of a camera of the portable electronic device 1050 can fire a flash within a few degrees of the retroreflective dots. As a result of the flash, the camera sensor can detect the presence and/or specific pattern of the retroreflective dots. The presence and/or pattern of the retroreflective dots can enable the processor 210 to determine the specific properties of the case 1190. For example, the retroreflective dots can be arranged in a unique pattern that identifies the model of the case 1190. Moreover, unlike a barcode or QR code, because the retroreflective dots can appear invisible to the human eye, a case 1190 that utilizes the retroreflective dots may be considered to be more cosmetically appealing due to having an appearance that is less unsightly than a barcode or QR code.

FIG. 11C illustrates an exemplary view 1130 of a case 1190 having a male data connector 1170, where the male data connector 1170 is configured to be received by a female data connector (not illustrated) of the portable electronic device 1050. In some embodiments, the case 1190 can include at least one of a power supply, a controller, a non-volatile memory, or a feedback component, as described in more detail with reference to FIG. 17. When the case 1190 is connected to the portable electronic device 1050 via the male data connector 1170, the portable electronic device 1050 can determine the properties of the case 1190 that are stored at the non-volatile memory of the case 1190. The properties of the case 1190 can be stored at the memory 220 of the portable electronic device 1050. In some examples, the male data connector 1170 is flexible in order to promote ease of insertion of the portable electronic device 1050 to the case 1190.

In some embodiments, in conjunction with the portable electronic device 1050 being inserted into the cavity 1194 of the case 1190 (and coupled to the male data connector 1170), the processor 210 can determine that a process to determine the case properties of the case 1190 is being initiated. In addition to determining properties of the case 1190, the processor 210 can also initiate an age counter to track the age, condition, and expected lifespan of the case 1190 when the portable electronic device 1050 being inserted into the cavity 1194 of the case 1190 (and coupled to the male data connector 1170). Thus, when the processor 210 determines that the case 1190 is reaching its near expected end of lifespan, the processor 210 can provide the user with a notification. In addition to providing a notification to the user, the processor 210 can suggest replacements or order replacement cases that will be compatible with the portable electronic device 1050.

Although FIG. 11C is directed to a wired connection for transmitting data between the case 1190 and the portable electronic device 1050, wireless connection techniques are also envisioned, such as where the case includes a case identifier 1124 or a wireless antenna, which will be described in more detail with reference to FIG. 16. In some embodiments, the properties of the case 1190 are stored at the memory 220 such that when the portable electronic device 1050 is removed from the cavity 1194, the properties of the case 1190 remain stored within the memory 220.

FIG. 11D illustrates an exemplary view 1140 of a case 1190 having one or more magnetic elements 1142 disposed internally within the back wall 1192 of the case 1190. In some examples, the magnetic elements 1142 can be embedded within at least one of the sidewalls, back wall, or corner portions of the case 1190. In some examples, the magnetic elements 1142 can be oriented in a predetermined orientation, such that the magnetic elements 1142 are associated with a directional bias that may facilitate the portable electronic device 1050 in detecting the one or more magnetic elements 1142. In some embodiments, the portable electronic device 1050 can include Hall effector sensors, a magnetometer, and/or a magnetic reader that can be utilized to detect the presence, orientation, and/or bias of the magnetic elements 1142. In some examples, the magnetic elements 1142 generate an external magnetic field. In this manner, the portable electronic device 1050 can detect the presence of not just the magnetic elements 1142, but also a case 1190 that includes the embedded magnetic elements 1142. The processor 210 of the portable electronic device 1050 can cause adjusted feedback parameters to be generated that accommodate for the presence, orientation and/or bias of the magnetic elements 1142. In some embodiments, the feedback response generated by the feedback components 260, 270 can be adjusted according to the adjusted feedback parameters.

In some embodiments, the portable electronic device 1050 can utilize the magnetic sensor to determine that the portable electronic device 1050 is carried within a recess of a case 1190. When the magnetic sensor detects the external magnetic field generated by the embedded magnetic elements 1142, the magnetic sensor can provide a detection signal to the processor 210. In some embodiments, the processor 210 can adjust the amount of haptic and/or acoustic feedback or activation force at an I/O component 290 (e.g., button, switch) based on the presence, orientation, and/or bias of the magnetic elements 1142 as further described with reference to FIGS. 12-13.

FIG. 11E illustrates an exemplary view 1150 of a case 1190 having one or more haptic and/or acoustic feedback components that are included in the case 1190, as also described with reference to FIGS. 17-19. In some embodiments, the case 1190 includes a built-in feedback component 1152 that can be configured to generate additional or supplemental haptic and/or acoustic feedback to supplement and/or substitute for the feedback components 260, 270 of the portable electronic device 1050. FIG. 11E illustrates that the built-in feedback component 1152 refers to a linear resonant actuator, which includes a mass 1154, a spring 1156, and a piezoelectric element 1158. The piezoelectric element 1158 can be configured to receive an electrical signal from the power supply 230 (as controlled by the processor 210 or other controller) that causes the piezoelectric element 1158 to actuate in a predetermined manner. Actuation of the piezoelectric element 1158 causes the displacement of the mass 1154 via spring 1156 according to a direction (D). In some embodiments, the mass 1154 can be referred to as an inertial mass. The inertial mass is suspended on the spring 1156 and driven with the piezoelectric element 1158. Although FIG. 11E illustrates that the displacement of the mass 1154 is in a side-to-side orientation, other directions and orientations are also envisioned to generate different types of feedback. In some embodiments, the displacement of the mass 1154 is aligned with the side-to-side direction of the haptic feedback component 260 of the portable electronic device 1050, where the haptic feedback component 260 is a linear resonant actuator. In this manner, the built-in feedback component 1152 can augment the haptic effects of the haptic feedback component 260. In some examples, the mass 1154 is configured to oscillate or displace in order to generate haptic and/or acoustic feedback. In some embodiments, the adjusted feedback parameters can be transmitted to the case 1190, such that the case 1190 can be configured to generate adjusted feedback. In some examples, the case 1190 can include at least one of a power supply, a controller, a non-volatile memory, or a feedback component that electrically communicate with the piezoelectric element 1158.

Although FIG. 11E illustrates that the feedback component 1152 refers to a linear resonance actuator driven by piezoelectric elements, other examples for driving the feedback component 1152 can include electroactive polymers, magnetic voice coils, and the like.

FIG. 11F illustrates an exemplary view 1140 of a case 1190 having one or more acoustic resonant tubes 1162 that are provided within channels 1164 that are included along the wall 1192. The acoustic resonant tubes 1162 can be configured to generate acoustic feedback at the case 1190, such as by improving the bass output response or resonance of the speakers of the portable electronic device 1050. In some embodiments, the acoustic resonant tubes 1162 can be sealed with plastic and then covered with leather, silicone, or other materials of the case 1190. The acoustic output properties (e.g., bass output) of the acoustic resonant tubes 1162 can depend upon whether the acoustic resonant tubes 1162 are sealed and the type of material(s) that it is covered by. In some examples, covering the acoustic resonant tubes 1162 with leather (as opposed to silicone) can yield a less powerful bass output since leather has better dampening properties than silicone. Although FIG. 11F illustrates the case 1190 having a series of generally serpentine tracks included along the back wall 1192 of the case 1190, other configurations, patterns, and positions are envisioned. In some examples, the acoustic resonant tubes 1162 can be included along the bottom of the case 1190 so that the acoustic resonant tubes 1162 are positioned adjacent to the bottom speakers of the portable electronic device 1050. By positioning the acoustic resonant tubes 1162 along the back wall 1192 of the case 1190, damage to the acoustic resonant tubes 1162 can be minimized or prevented.

In some embodiments, the case 1190 includes a controller having an equalizer that is configured to adjust or tune the acoustic resonance of the acoustic resonant tubes 1162. For example, the acoustic resonant tubes 1162 are characterized as having an initial resonance peak. The equalizer can be utilized to adjust the acoustic resonance such as to provide acoustic feedback that compensates for the properties of the case 1190.

In some embodiments, the processor 210 can adjust the acoustic feedback by the speakers. For example, the processor 210 can determine through any number of exemplary embodiments described herein that the case 1190 includes acoustic resonant tubes 1162. The processor 210 can adjust the acoustic feedback output of the speakers of the portable electronic device 1050 to minimize the amount of bass output, therefore, conserving energy with the knowledge that the acoustic resonant tubes 1162 can boost the bass output by the speakers.

Although FIGS. 11A-11F describe various embodiments of determining properties of the case 1190 in conjunction with adjusting an amount of haptic and/or acoustic feedback that is generated by at least one of the portable electronic device 1050 or the case 1190, it should be noted that the properties of the case 1190 can also be utilized to modify or adjust other settings of the portable electronic device 1050. In some examples, the properties of the case 1190 can be utilized to adjust camera settings, camera flash settings, display settings, and the like. In one example, if the processor 210 of the portable electronic device 1050 determines that the case 1190 has a white color, then the processor 210 can adjust the camera flash settings to reduce the amount of flash in order to minimize the amount of light that is incidentally refracted from the case 1190. In another example, if the case 1190 has a black color, then the processor 210 can adjust the camera flash settings to increase the amount of flash.

In some embodiments, the portable electronic device 1050 can utilize a camera module to take a picture of the case 1190 itself. The application 310 of the portable electronic device 1050 can be configured to determine general properties of the case 1190, such as shape and color by using the picture of the case 1190. In this manner, the portable electronic device 1050 is not required to communicate with a database to determine general properties of the case 1190.

FIGS. 12A-12C illustrate perspective views of a portable electronic device 1200 that is configured to detect an amount of strain exerted against an I/O component, in accordance with some embodiments. As shown in FIG. 12A, the portable electronic device 1200 includes an I/O component 1210, such as a volume button. In some examples, when the portable electronic device 1200 is carried by a case, the housing of the case can provide a protective cover for the I/O component 1210. However, the protective cover can also obstruct the depressing of the I/O component 1210, such that the user perceives a different tactile sensation and activation force when depressing the I/O component 1210.

As shown in FIG. 12B, the I/O component 1210 can include sensors 1260, such as strain gages. FIG. 12B illustrates a strain gage that is incorporated within the I/O component 1210. The strain gage can be applied at a central and/or peripheral portion of the I/O component 1210 to detect an amount of strain that is exerted against the I/O component 1210. The sensors 1260 can be comprised of a thin conductive film 1262 having a strain sensitive pattern 1266 and terminals 1264. When strain is exerted against the sensors 1260, e.g., a housing of a case, the thin conductive film 1262 becomes compressed which can increase an amount of resistance at the thin conductive film 1262 as detected by a dedicated microcontroller. Accordingly, the microcontroller can derive a value of a force that is exerted against the I/O component 1210. The microcontroller can receive a detection signal from the sensors 1260. Alternatively, when the strain is removed from the sensors 1260, the amount of tension at the thin conductive film 1262 is reduced, which can decrease the amount of resistance at the thin conductive film 1262. The portable electronic device 1200 can be configured to detect the amount of strain that is exerted against the I/O component 1210 and/or the housing of the portable electronic device 1200. In some embodiments, the sensor 1260 can be positioned just below the I/O component 1210 or within the housing of the portable electronic device 1200.

As shown in FIG. 12C, the I/O component 1210 can include magnetic sensors 1270, such as Hall effect sensors. FIG. 12C illustrates a Hall effect sensors 1270 that is positioned internally relative to the I/O component 1210. The Hall effect sensors 1270 can detect an external magnetic field that is generated by an external agent (e.g., magnetic elements 1142 of case 1190). In some embodiments, the external magnetic field can be represented as one or more magnetic vectors ($F_m$) that are directed towards the portable electronic device 1200. The external magnetic field can disturb a straight flow of electrons provided along a side of a conductive plate 1272 of the Hall effect sensor, which causes the electrons to deflect to one side of the plate 1272—such a change can be reflected as a change in output voltage. In some embodiments, the Hall effect sensor 1270 is a transducer that is capable of generating an output voltage. In some embodiments, the Hall effect sensor 1270 varies the output voltage in response to the external magnetic field. In some embodiments, the Hall effect sensor 1270 includes a predetermined threshold value. Thus, when the output voltage exceeds the predetermined threshold value, the Hall effect sensors 1270 is capable of functioning as a switch to provide a detection signal to the processor or microcontroller. In some examples, the Hall effect sensors 1270 can determine any combination of a direction, magnitude, or position of the external magnetic field and/or the position, bias, or orientation of the source of the external magnetic field (e.g., magnetic elements 1142). In some embodiments, the Hall effect sensors 1270 can be referred to as linear transducers, and the portable electronic device 1200 can include an A/D converter to process the detection signal. In some embodiments, the sensor 1270 can be positioned just below the I/O component 1210 or within the housing of the portable electronic device 1200.

Although FIGS. 12A-12C illustrate that sensors 1260 are incorporated at a volume button, it is also envisioned that sensors 1260 can be positioned at other regions of the housing 1220, such as at the corners 1222 of the housing 1220, or other regions of the housing 1220 that will be subjected to strain.

Although FIGS. 12A-12C illustrate that the sensors 1260 can refer to strain gages and magnetic sensors (e.g., Hall effect sensors), other types of sensing materials can also be utilized to achieve the techniques described herein, such as other types of sensors, piezoelectric elements, electroactive substrates, force sensors, capacitive sensors, and the like.

Figure 13A:
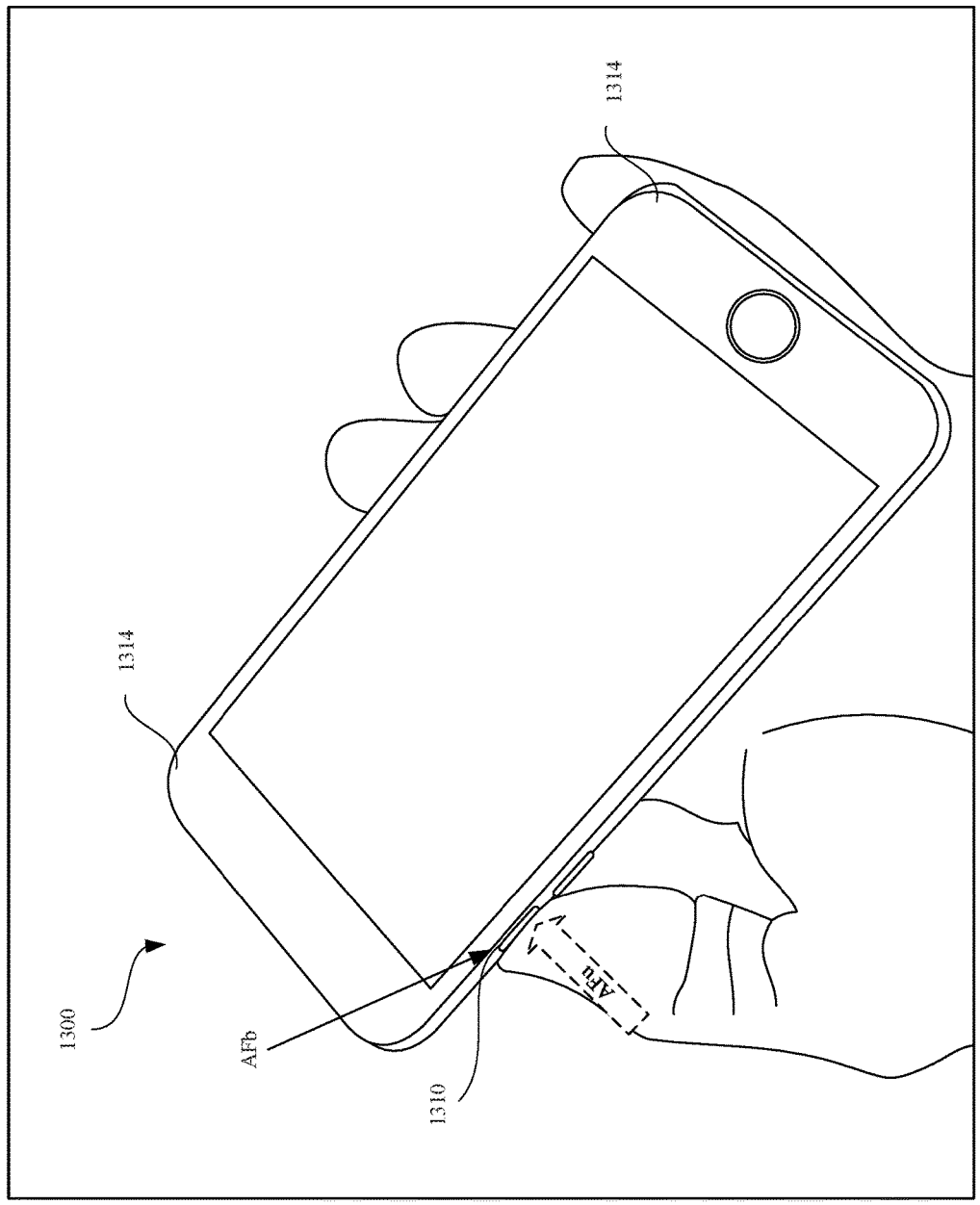
FIGS. 13A-13B illustrate perspective views of a portable electronic device that is configured to adjust an amount of activation force that is required to depress an I/O component, in accordance with some embodiments.
Figure 13B:
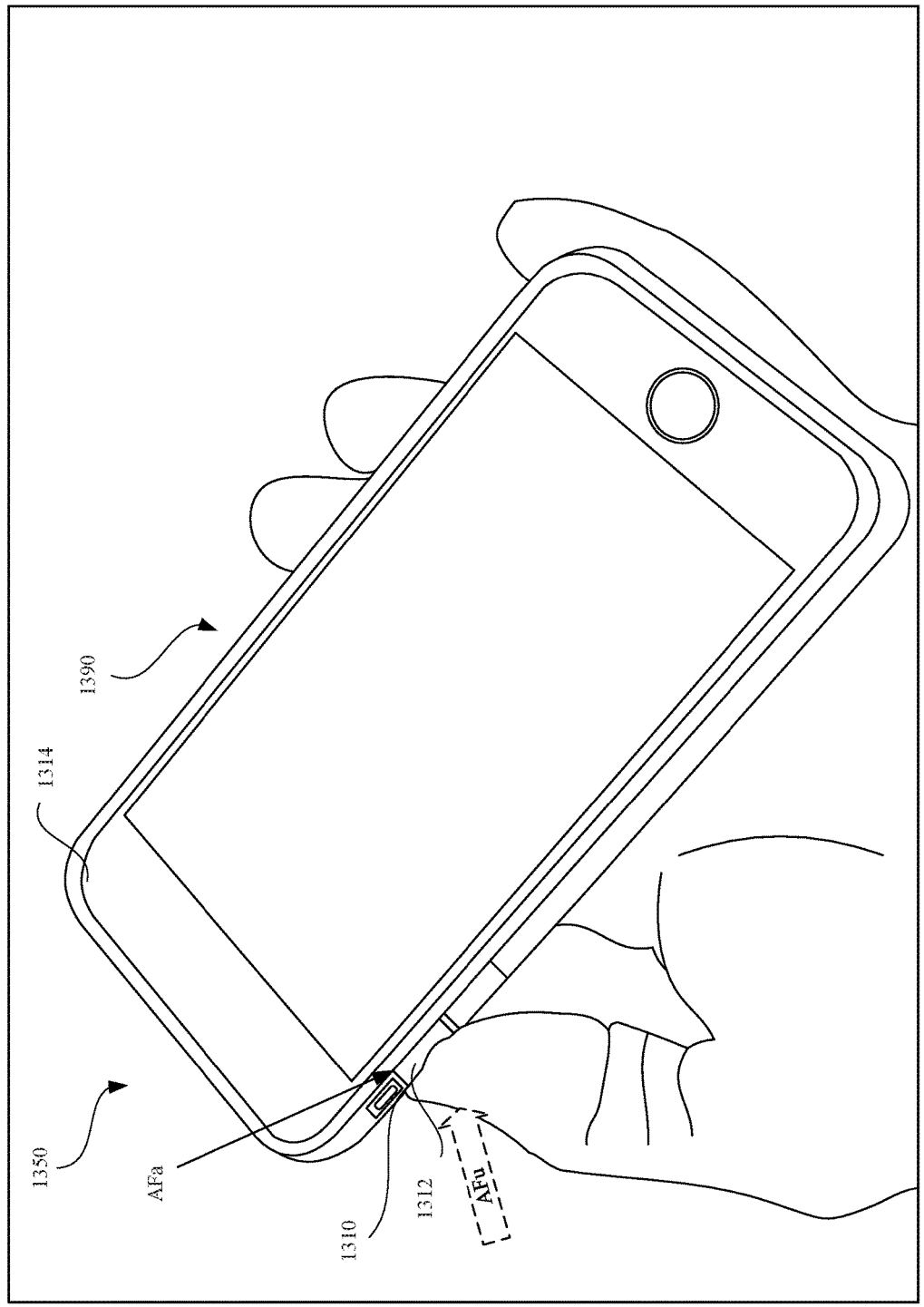

FIGS. 13A-13B illustrate perspective views of a portable electronic device 1300 that is configured to adjust an amount of activation force at the I/O component that is required to depress the I/O component, in accordance with some embodiments. FIG. 13A illustrates a perspective view of a portable electronic device 1300 that is not carried by a case. In this manner, the portable electronic device 1300 can be characterized as lacking any strain that is exerted against the I/O component 1310. In some embodiments, the I/O component 1310 is mechanically actuated button (e.g., spring).

In some embodiments, the I/O component 1310 is a solid-state switch. FIG. 13A illustrates a user's thumb depressing the I/O component 1310 in order to cause an electronic component of the portable electronic device 1300 to increase a volume that is emitted by an acoustic feedback component 260. According to one example, the I/O component 1310 is characterized as having a baseline activation force ($AF_b$) of 10 N, where an activation force of at least 10N is required to depress the I/O component 1310 so as to cause the electronic component to provide an electrical signal.

In some embodiments, the I/O component 1310 can include a strain gage sensor (see FIGS. 12A-12C) that detects an amount of strain that is exerted against the surface of the I/O component 1310. In some embodiments, the corners 1314 of the portable electronic device 1300 can include strain gage sensors to detect an amount of strain that is exerted against the corners 1314. Other regions of the portable electronic device 1300 that can include strain gage or force sensors for detecting strain include the display glass, the front face of the housing, back wall of the housing, other buttons or switches, and the sidewalls of the housing. Referring to FIG. 13A, there is minimal to no strain that is exerted against the I/O component 1310 by a foreign object (e.g., case). In this manner, an activation force of 10 N is sufficient to depress the I/O component 1310 to elicit an electrical signal from the electronic component.

FIG. 13B illustrates a perspective view of a portable electronic device 1300 that is carried by a case 1390. As shown in FIG. 13B, the case can include protective button covers 1312 that are provided over the I/O component 1310 and correspond to the dimensions and shape of the I/O component 1310. The strain gage sensor 1260 at the I/O component 1310 can detect an amount of strain that is exerted against the I/O component 1310 by the protective button covers 1312. Thus, when the user's thumb depresses the protective button covers 1312 to actuate the I/O component 1310, the user perceives a significant change in the amount of user activation force ($AF_u$) required to depress the I/O component 1310. For example, with the protective button covers 1312 disposed over the I/O component 1310, the I/O component 1310 can require an obstructed activation force ($AF_o$) of about 15 N. However, increasing the amount of user activation force ($AF_u$) that is required to depress the I/O component 1310 can decrease the user's satisfaction.

Accordingly, to address this situation, the processor 210 or a dedicated microcontroller of the strain gage sensor 1260 can be configured to adjust the amount of activation force at the I/O component 1310 that is required to depress the I/O component 1310 in order to elicit the electrical signal from the electronic component. For example, the strain gage sensor 1260 can be electrically connected to the power supply 230 of the portable electronic device 1300. In response to determining that the amount of activation force required to depress the I/O component 1310 has been adjusted, the processor 210 or the dedicated microcontroller can electrically actuate the I/O component 1310 to reduce an amount of resistance at the I/O component 1310. For example, if the I/O component 1310 includes a piezoelectric element, then a pair of electrodes can actuate the piezoelectric element to oscillate or displace in a direction that corresponds to the direction of the user's activation force. In some examples, the piezoelectric element can be configured to bend in a specific direction depending upon at least one of the amplitude of the input voltage, polarity, pulse width, or pulse frequency generated by the electrodes. The I/O component 1310 can also include materials such as electroactive substrates or magnetic elements that can be electrically actuated to oscillate or displace in specified direction. By adjusting the amount of resistance at the I/O component 1310, the processor 210 can decrease the amount of activation force that the user actually perceives is required to depress the I/O component 1310. In some examples, the processor 210 can electrically or mechanically actuate the material of the I/O component 1310 to become more stiff or elastic. In some embodiments, the aforementioned materials or components can be positioned adjacent to the I/O component 1310, and separate from the I/O component 1310.

Additionally, the processor 210 can adjust the amount of activation force ($AF_a$) at the I/O component 1310 to compensate for different material properties of the case 1390, as described with reference to FIGS. 11A-11D. In some examples, materials such as silicone, polyurethane, and leather are characterized as being velocity dependent. In other words, the velocity at which these materials move can directly affect the activation force ($AF_b$) at the I/O component 1310. Accordingly, the processor 210 can adjust the amount of activation force at the I/O component 1310 to be velocity dependent.

In the described embodiments, the processor 210 can adjust the amount of activation force ($AF_a$) at the I/O component 1310 such that the user does no perceive any change in the amount of activation force required to depress the I/O component 1310. In some embodiments, the processor 210 can alter the amount of haptic feedback and/or acoustic feedback that is generated in conjunction with adjusting the amount of activation force ($AF_a$) at the I/O component 1310 to facilitate in tricking the user's perception that the amount of user activation force ($AF_u$) has not been altered. In some embodiments, the techniques described herein for adjusting the amount of activation force ($AF_a$) at the I/O component 1310 can take into account the properties of the case 1390, using the techniques described with reference to FIGS. 10-11.

Figure 14:
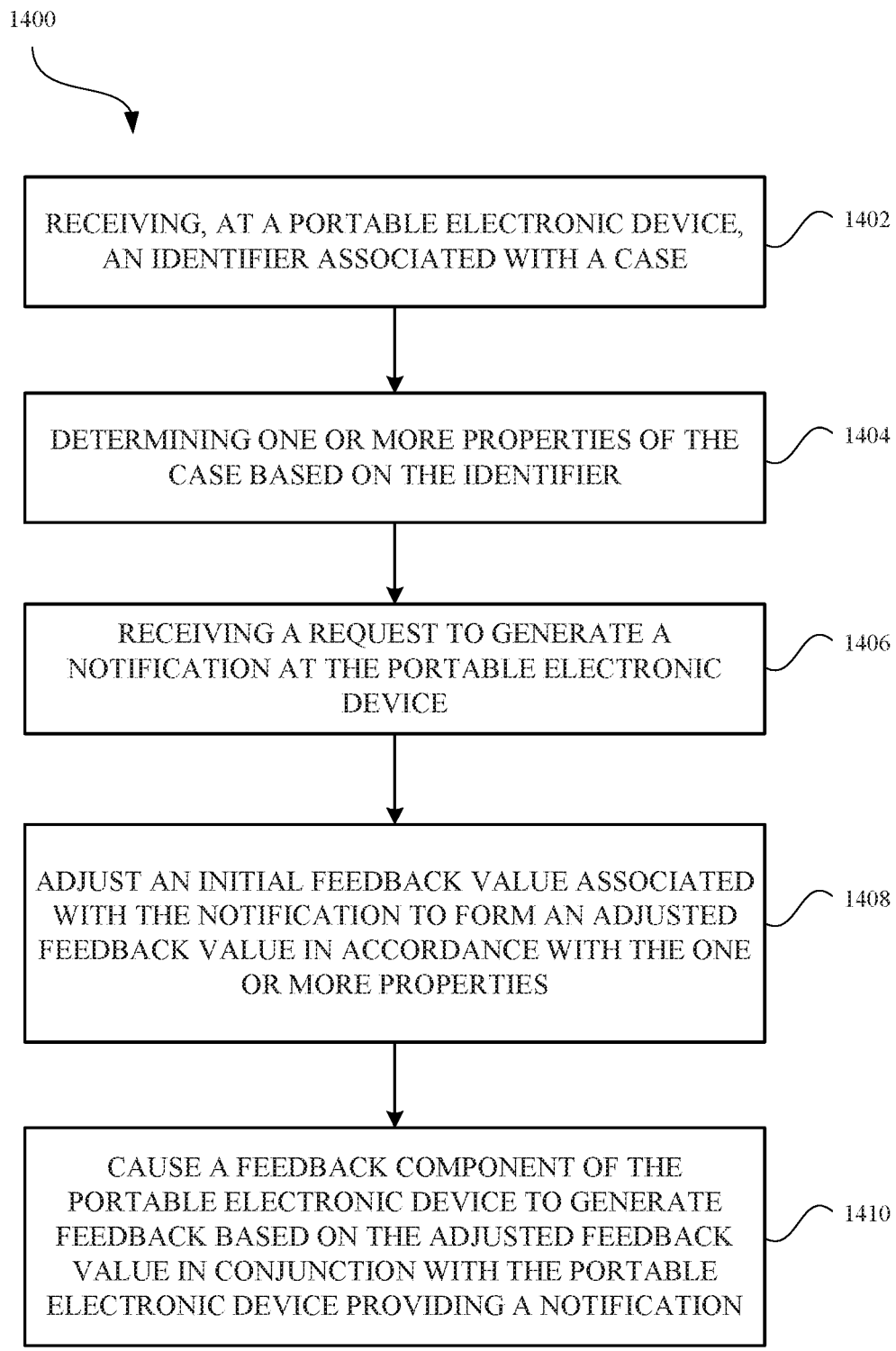
FIG. 14 illustrates a method for adjusting feedback associated with providing a notification at a portable electronic device, according to some embodiments.

FIG. 14 illustrates a method 1400 for adjusting an amount of feedback in conjunction with providing a notification at a portable electronic device 910, according to some embodiments. As shown in FIG. 14, the method 1400 begins at step 1402, where the processor 210 of the portable electronic device 910 receives an identifier associated with a case 950 for the portable electronic device 910. Various examples of the identifier are described with reference to FIGS. 11A-D. At step 1404, the processor 210 can determine one or more properties of the case 950 based on the identifier. Subsequently, the one or more properties of the case 950 are stored at the memory 220. Thereafter, at step 1406, the processor 210 can receive a request to generate a notification at the portable electronic device 910. In some examples, the notification can refer to at least one of a device-generated request or a user-initiated request. At step 1408, the processor 210 can dynamically adjust an initial feedback value associated with the notification to form an adjusted feedback value in accordance with the one or more properties of the case 950. In some examples, the notification has an initial feedback value. For example, a text message can be associated with a baseline amount of haptic feedback (e.g., 5 N) or acoustic feedback (e.g., 60 dB). The baseline amount of haptic feedback and acoustic feedback can be adjusted by the processor 210 in taking into consideration the properties of the case 950. Subsequently, at step 1410, the processor 210 can cause a feedback component (e.g., haptic, acoustic) of the portable electronic device 910 providing a notification.

Figure 15:
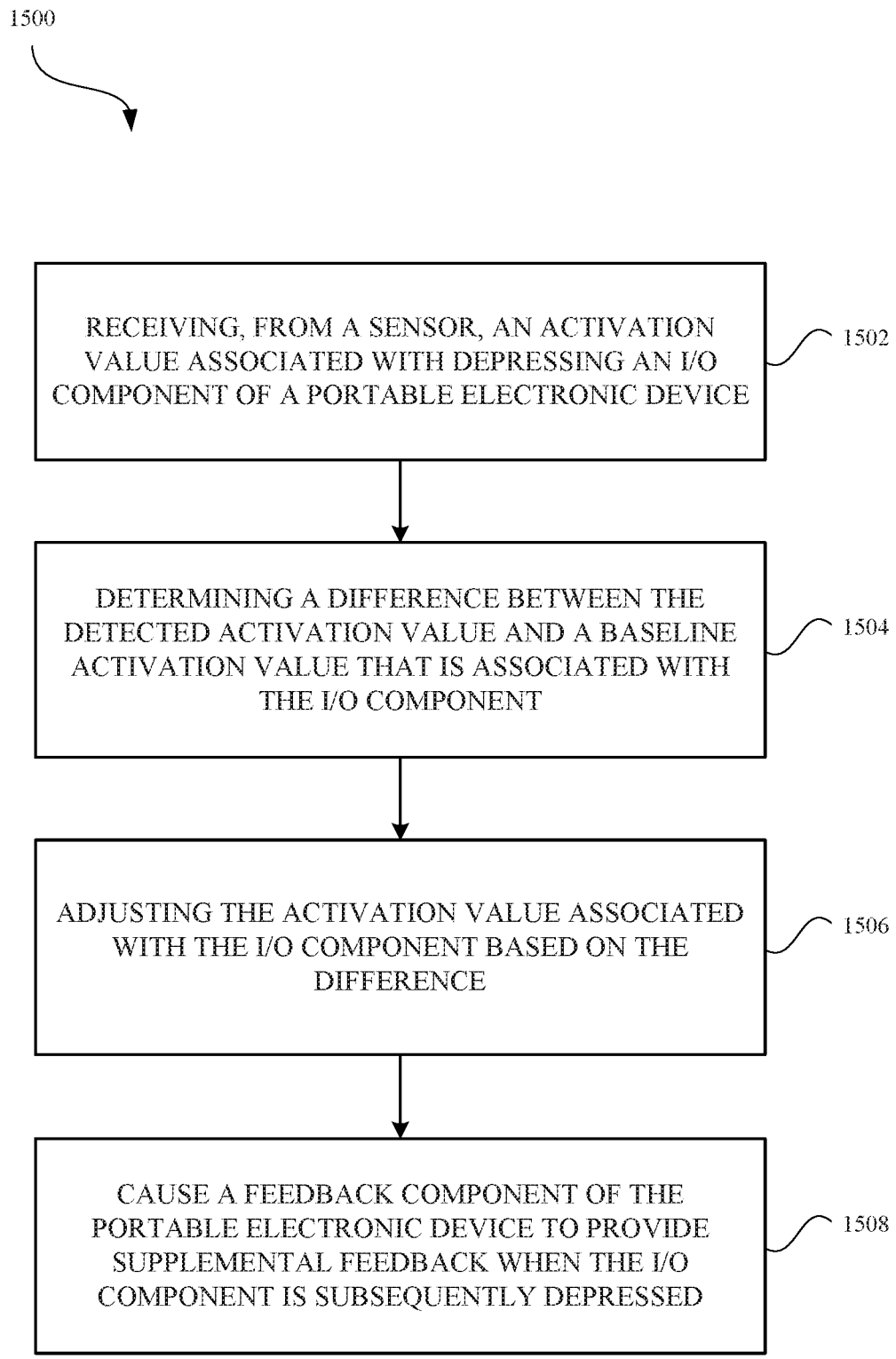
FIG. 15 illustrates a method for adjusting an activation force associated with an I/O component of a portable electronic device, according to some embodiments.

FIG. 15 illustrates a method 1500 for adjusting an amount of activation force associated with an I/O component of a portable electronic device 910, according to some embodiments. As shown in FIG. 15, the method 1500 begins at step 1502, where the processor 210 of the portable electronic device 200 receives, from a sensor, an activation value associated with depressing the I/O component 290. In some examples, the activation value can be affected by one or more environmental conditions or device conditions. At step 1504, the processor 210 can determine a difference between the detected activation force and a baseline activation force associated with depressing the I/O component 290. The baseline activation force can refer to the activation force normally required to depress the I/O component 290 (when there is an absence of strain or force exerted against the I/O component 290. At step 1506, the processor 210 can adjust the activation force associated with the I/O component 290 to compensate for the difference in detected activation force such that the user does not generally perceive any difference in the amount of activation force required. In some examples, the I/O component 290 include piezoelectric elements or electroactive substrates that can be electrically actuated to adjust an amount of resistance at the I/O component 290 when the I/O component 290 is subsequently depressed (i.e., press event). At step 1508, the processor 210 can optionally cause at least one of the haptic or acoustic feedback components 260, 270 to provide supplemental feedback to facilitate in tricking the user's perception that the activation force has not been altered. In some examples, the processor 210 can generate supplemental acoustic feedback to generate an audible "click" sound that imitates the mechanical actuation of a switch or button.

Figure 16:
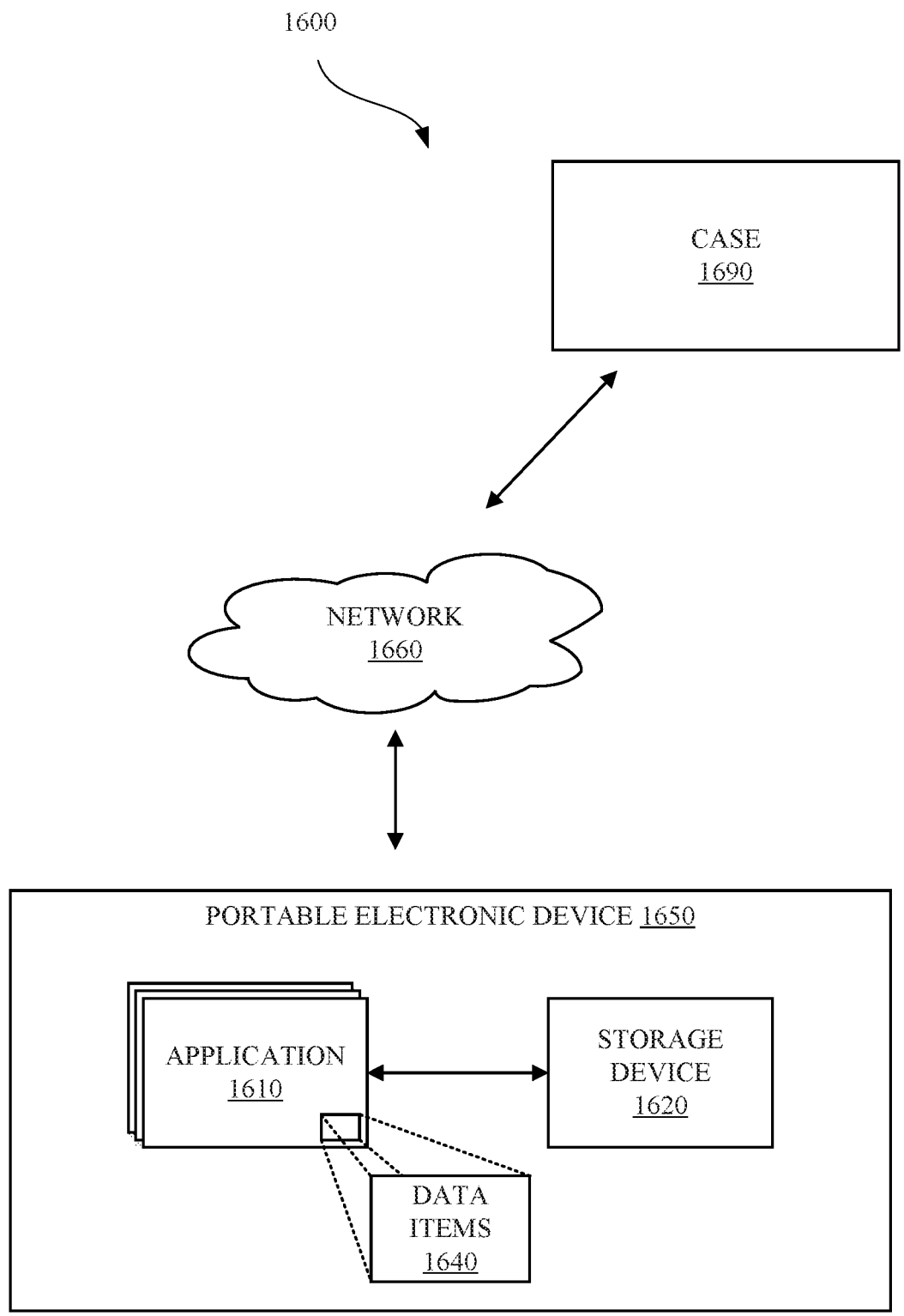
FIG. 16 illustrates a block diagram of different components of a system that is configured to implement the various techniques described herein, according to some embodiments.

FIG. 16 illustrates a block diagram of different components of a system 1600 that is configured to implement the various techniques described herein, such as generating feedback at the case, according to some embodiments. More specifically, FIG. 16 illustrates a high-level overview of the system 1600, which includes a portable electronic device 1650 that can represent, for example, a smartphone, smartwatch, or other electronic device that is capable of providing an electronic notification. According to some embodiments, the portable electronic device 1650 can be configured to execute (e.g., via an operating system established at the portable electronic device 1650) various software applications 1610. In some embodiments, the application 1610 can pair the portable electronic device 1650 to the case 1690. As described herein, electronic pairing generally refers to a master/slave relationship, where the portable electronic device 1650 controls how and when the case 1690 functions. In some examples, the portable electronic device 1650 transmits data to the case 1690 to induce functionality at the case 1690. In some examples, the case 1690 can generate supplemental feedback in conjunction with the portable electronic device 1650 providing a notification. In some embodiments, the application 1610 can function to merely transmit data between the portable electronic device 1650 and the case 1690. In some embodiments, the application 1610 can act to facilitate in the portable electronic device 1650 determining properties of the case 1690.

As shown in FIG. 16, the application 1610 and a storage device 1620 can be configured to directly communicate with one another. In some embodiments, the storage device 1620 can include a data item 1640 managed by the application 1610. In one example, the application 1610 can refer to a program for executing a feedback loop mechanism between the case 1690 and the portable electronic device 1650. In some embodiments, the feedback loop can refer to an open feedback loop or a closed feedback loop. The application 1610 can manage feedback generated by at least one of the portable electronic device 1650 or the case 1690 according to at least one of environmental conditions or device conditions. In some examples, the data item 1640 can refer to specific environmental conditions or device conditions that are monitored and recorded by the application 1610. Additionally, the data item 1640 can specify specific sub-conditions that more particularly describe or categorize the environmental conditions and/or device conditions that are to be monitored.

The portable electronic device 1650 can determine the extent that which one or more environmental conditions, device conditions, or case properties can impact the supplemental feedback that is to be generated by an acoustic or haptic feedback component of the case 1690. In some examples, the processor 210 of the portable electronic device 1650 can provide one or more supplemental feedback parameters to the case 1690. The supplemental feedback parameters can refer to controlling the power supply of the case such as to control at least one of amplitude, duty cycle, voltage, pulse, frequency, and the like of electrical signal provided by the power supply 230 to the acoustic or haptic feedback components of the case 1690 for generating acoustic or haptic feedback. In some examples, the case 1690 includes an on-board power supply for powering a feedback component.

As shown in FIG. 16, the portable electronic device 1650 is configured to communicate with the case 1690 via a network 1660, where the network 1660 can represent at least one of a global network (e.g., the Internet), a wide area network, a local area network, a wireless personal area network (WPAN), and the like. In some examples, the network 1660 can represent a WPAN for transmitting data between the portable electronic device 1650 and the case 1690. The WPAN network can represent Bluetooth (IEEE 802.15A), ZigBee, Wireless USB, and the like. In some examples, the network can refer to Near-Field Communication (NFC). According to some embodiments, the portable electronic device 1650 can be configured to provide instructions to the case 1690 to enable pairing between the portable electronic device 1650 and the case 1690, as well as enable the case 1690 to generate supplemental feedback in response to a supplemental feedback request that is provided by the portable electronic device 1650.

Figure 17:
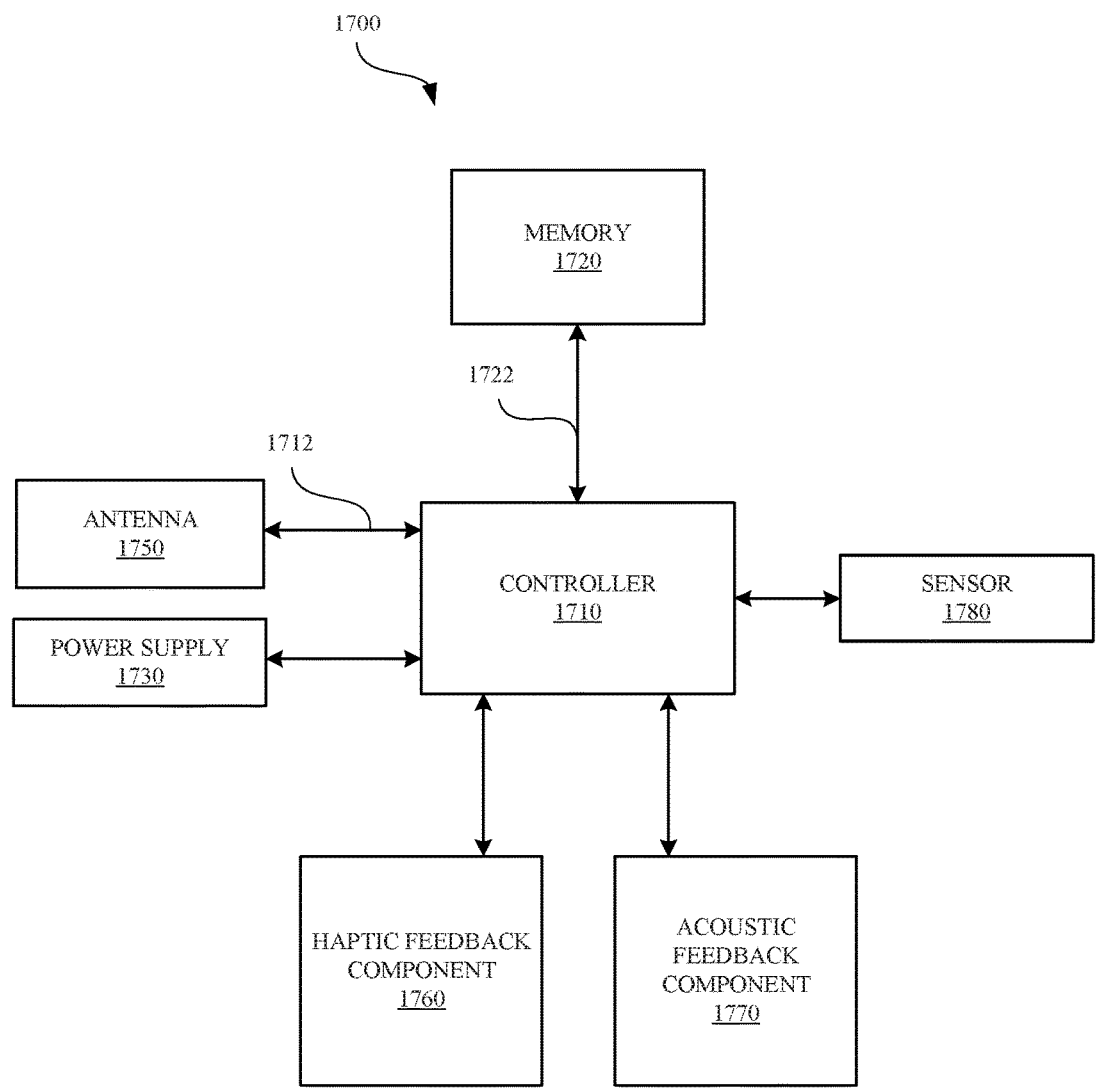
FIG. 17 illustrates a block diagram of a case that can be used to provide feedback, according to some embodiments.

FIG. 17 illustrates a block diagram of a case 1700 that can generate supplemental feedback, according to some embodiments. As shown in FIG. 17, the case 1700 includes one or more controllers 1710 for controlling the overall operation of the case 1700. The one or more controllers 1710 can refer to microcontrollers for performed dedicated functions or a central processing unit (CPU). The case 1700 includes a memory 1720, such as flash memory, semiconductor (solid state) memory or the like. The case 1700 can also include a Random Access Memory (RAM) and a Read-Only Memory (ROM). The ROM can store programs, utilities or processes to be executed in a non-volatile manner. The RAM can provide volatile data storage, and stores instructions related to the operation of the case 1700. In some examples, the memory 1720 stores one or more properties of the case 1700, including manufacturer, model type, material composition, manufacture data, and the like. In some examples, the properties of the case can be transmitted to the portable electronic device 1650, as described with reference to FIGS. 11A-11D.

In some embodiments, a data bus 1722 can facilitate data transfer between the memory 1720 and the controller 1710. In some embodiments, the case 1700 includes an antenna 1750. A network/bus interface 1712 can couple the antenna 1750 to the controller 1710. The antenna 1750 can communicate with the portable electronic device 1650 via any number of wired or wireless communication protocols, including at least one of a global network (e.g., the Internet), a wide area network, a local area network, a wireless personal area network (WPAN), and the like. In some examples, the antenna 1750 can transmit data to the portable electronic device 1650 over IEEE 802.11 (e.g., a Wi-Fi networking system), Bluetooth (IEEE 802.15.1), ZigBee, Wireless USB, Near-Field Communication (NFC), a cellular network system (e.g., a 3G/4G/5G network such as UMTS, LTE, etc.), Radio-Frequency signals, and the like.

In some embodiments, the case 1700 includes a power supply 1730. In some embodiments, the controller 1710 can control an amount of amplitude, frequency, pulse, or polarity of an electrical current that is to be transmitted from the power supply 1730 to the haptic feedback component and/or acoustic feedback components 1760, 1770. In some embodiments, the power supply 1730 includes a mass that is coupled to the power supply (e.g., battery). The spring-loaded mass can be utilized as a haptic feedback component 1760. In some embodiments, the controller 1710 can control an amount of amplitude, frequency, pulse, or polarity of an electrical current that is to be transmitted from the power supply 1730 to the haptic feedback component and/or acoustic feedback components 1760, 1770. The haptic feedback components 1760 can also refer to at least one of magnetic elements, piezoelectric elements, linear resonance actuators, electroactive substrates, displaceable mass, and the like. The haptic feedback components 1760 can be configured to generate haptic feedback in conjunction with receiving a request from the portable electronic device 1650. For example, in response to receiving a request to provide a notification, the portable electronic device 1650 can transmit a supplemental feedback request to the controller 1710 of the case 1700. Power for driving the haptic feedback components 1760 can be provided by the power supply 1730. In some embodiments, the controller 1710 can generate haptic feedback and acoustic feedback without communication with the portable electronic device 1650 (i.e., non-master/slave relationship) via user of a sensor 1780 that is included in the case 1700.

In some embodiments, the case 1700 includes at least one sensor 1780 for detecting at least one stimulus, such as environmental conditions or context that are present in the general surroundings of the case 1700. The sensor 1780 can refer to at least one of a light sensor, a proximity sensor, an accelerometer, a strain gage, a capacitive sensor, a Hall Effect sensor, a force sensor, a magnetometer, a load cell, a magnetometer, microphones, pedometers, and the like. In some embodiments, the sensor 1780 and the controller 1710 can communicate with one another to establish a feedback loop for generating haptic and/or acoustic feedback. The sensors 1780 can provide a detection signal in response to detecting the at least one stimulus.

In some embodiments, the case 1700 can generate supplemental feedback that is intended to either replace feedback that cannot be generated at the portable electronic device 1650 or to enhance feedback that is generated by the portable electronic device 1650. In some examples, the processor 210 of the portable electronic device 1650 can determine that the "Battery Level" 520 of the power supply 230 is low, and that it may be undesirable to further strain the power supply 230 by generating haptic feedback in response to providing a notification. In order to avoid straining the power supply 230, but while it may still be desirable to generate some amount of haptic feedback, the processor 210 can provide instructions to the case 1700 to cause the case 1700 to generate haptic feedback by the haptic feedback component 1760.

In another example, the sensor 1780 of the case 1700 can detect a stimulus, such as one or more environmental conditions or device conditions that are present in conjunction with the portable electronic device 1650 receiving a request to provide a notification (without interaction from the portable electronic device 1650). Specifically, the controller 1710 can utilize the sensors 1780 to determine conditions that are present. In this manner, the case 1700 can independently develop haptic and/or acoustic feedback parameters, and generate haptic or acoustic feedback.

In another example, the processor 210 of the portable electronic device 1650 can determine that the acoustic feedback component 1770 (e.g., speakers) of the case 1700 can supplement the speakers of the portable electronic device 1650. For example, the speakers of the case may have better bass output, while the speakers of the portable electronic device 1650 may be better equipped to provide high and mid-frequency range sounds. Accordingly, the processor 210 can generate an adjusted feedback parameter for use by the acoustic feedback component 270 that can provide acoustic feedback in the high and mid-frequency range sounds by adjusting electrical signals of the power supply 230 to the acoustic feedback component. Additionally, the processor 210 can transmit a supplemental feedback parameter to the controller 1710 so that the case 1700 can generate acoustic sounds at a low frequency range. In some embodiments, the controller 1710 includes an equalizer that can be configured to adjust the resonance peak of the acoustic feedback component 1770.

Figure 18:
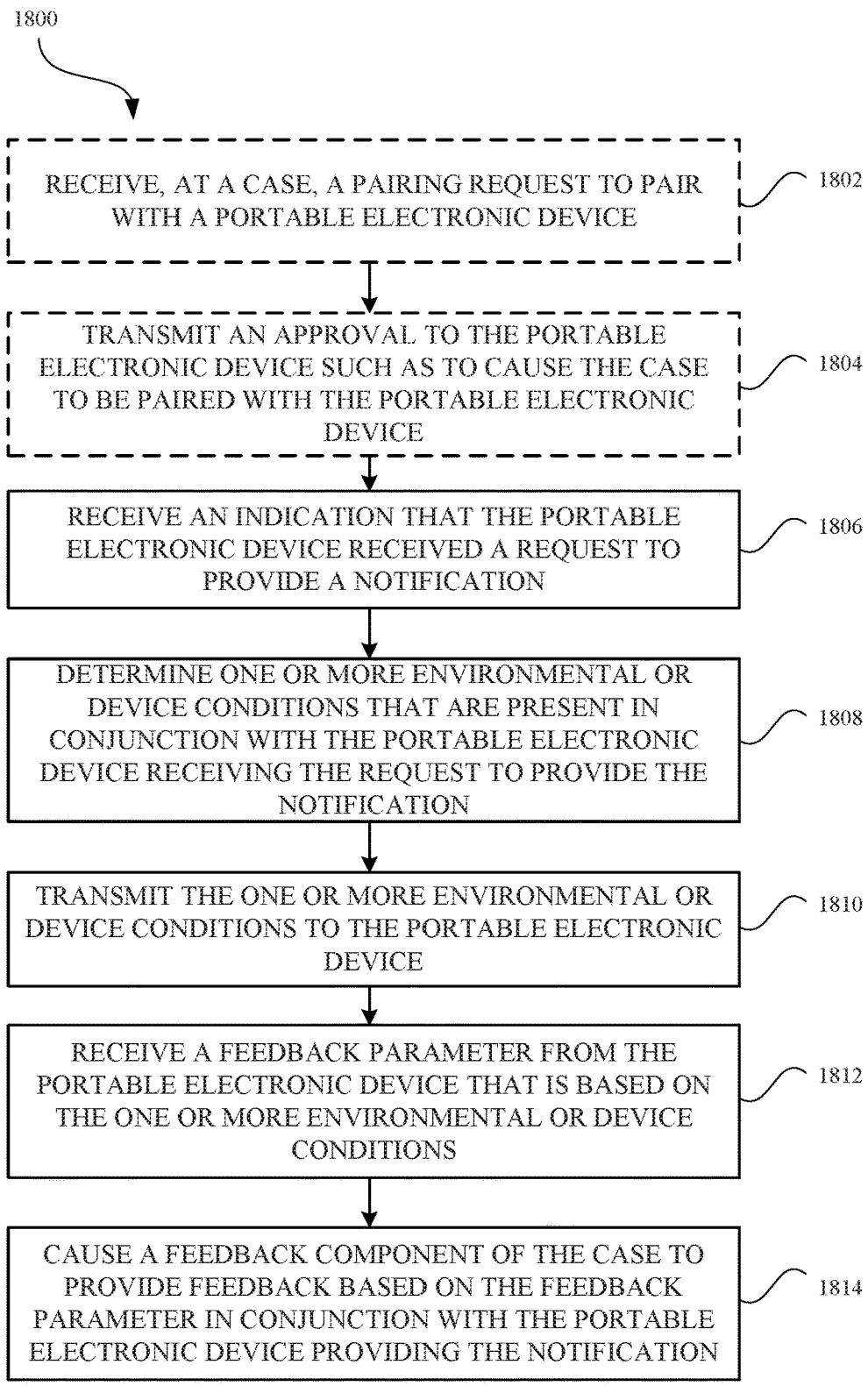
FIG. 18 illustrates a method for generating feedback at a case in conjunction with the portable electronic device providing a notification, in accordance with some embodiments.

FIG. 18 illustrates a method 1800 for generating feedback at a case in conjunction with the portable electronic device providing a notification, in accordance with some embodiments. As shown in FIG. 18, the method 1800 optionally begins a step 1802, where the controller 1710 of the case 1690 receives a request to pair with the portable electronic device 1650. Subsequently, at optional step 1804, the controller 1710 can transmit an approval to the portable electronic device 1650 such as to cause the portable electronic device 1650 and the case 1690 to be paired. The controller 1710 can transmit properties of the case 1690 to the portable electronic device 1650, such as manufacturer, model, manufacture data, dimensions, weight, and the like within the pairing approval. At step 1806, the controller 1710 can receive an indication that the portable electronic device 1650 has received a request to provide a notification. At step 1808, the controller 1710 can determine one or more environmental or device conditions that are present in conjunction with the portable electronic device 1650 receiving the request to provide the notification. At step 1810, the controller 1710 can transmit the one or more environmental or device conditions to the processor 210 of the portable electronic device 1650. At step 1812, the controller 1710 can receive a feedback parameter from the processor 210 that is based on the one or more environmental or device conditions that are detected by the portable electronic device 1650. At step 1814, the controller 1710 can cause the haptic or acoustic feedback components 1760, 1770 to generate feedback in conjunction with the portable electronic device 1650 providing the notification.

Figure 19:
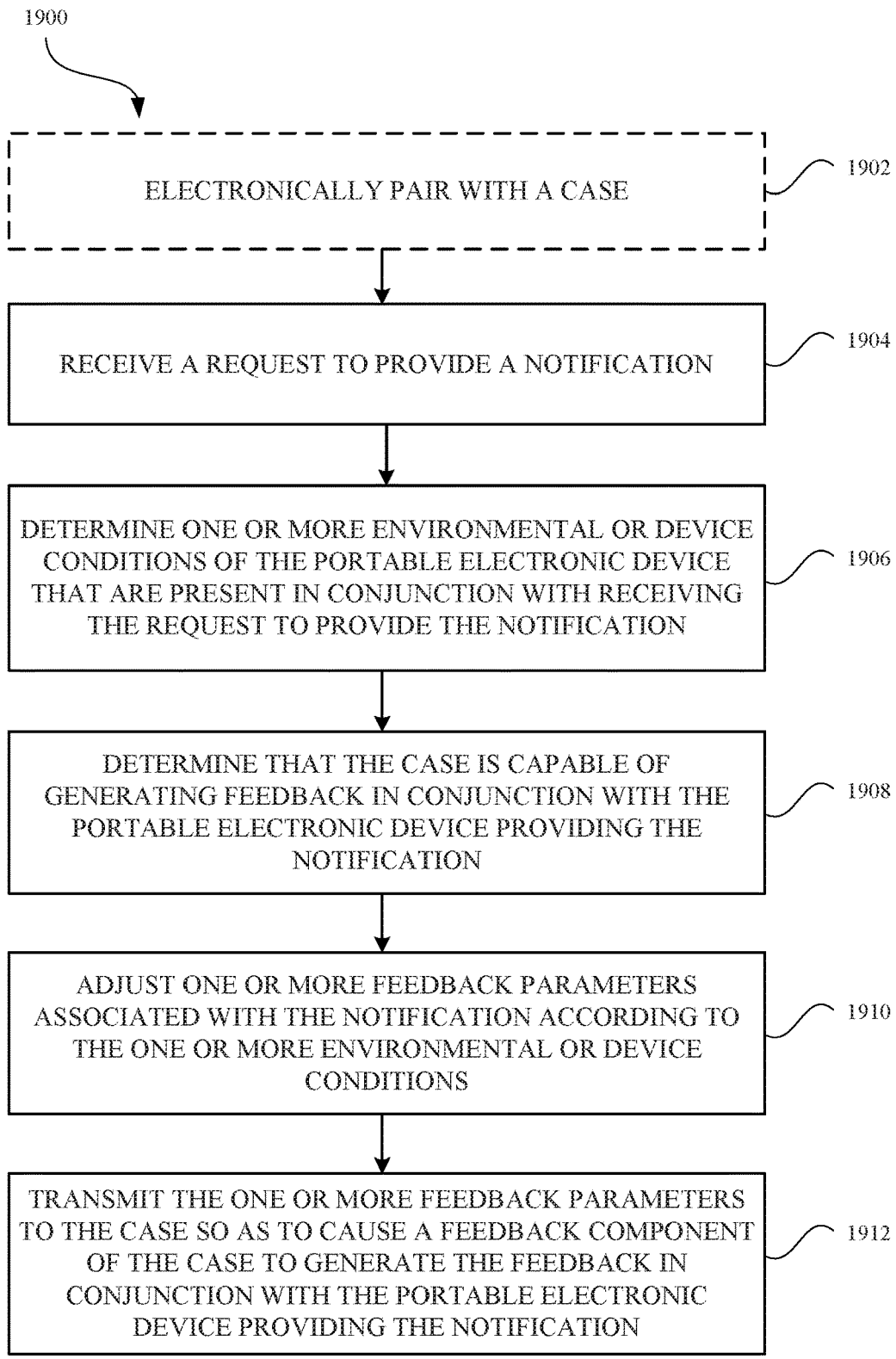
FIG. 19 illustrates a method for generating feedback at a case in conjunction with the portable electronic device providing a notification, in accordance with some embodiments.

FIG. 19 illustrates a method 1900 for generating feedback at a case in conjunction with the portable electronic device providing a notification, in accordance with some embodiments. The method 1900 optionally begins at step 1902, where the processor 210 transmits a pairing request to the controller 1710 of the case 1690. Subsequently, the case 1690 and the portable electronic device 1650 can be electronically paired. Once paired, the processor 210 can receive a request to provide a notification at step 1904. The request to provide the notification can be device-initiated or user-initiated. At step 1906, the processor 210 can determine one or more environmental conditions or device conditions that are present in conjunction with receiving the request to provide the notification. At step 1908, the processor 210 can determine that the case 1690 is capable of generating feedback in conjunction with the portable electronic device 200 providing the notification. At step 1910, the processor 210 can adjust one or more feedback parameters associated with the notification according to the one or more environmental or device conditions. At step 1912, the processor 210 can transmit the one or more feedback parameters to the controller 1710 such as to cause the haptic or acoustic feedback components 1760, 1770 to generate feedback in conjunction with the portable electronic device 200 providing the notification. In some examples, the one or more feedback parameters can refer to an amplitude, frequency, pulse, voltage cycle, and the like that are intended to instruct the controller 1710 as to how to generate the supplemental feedback from the haptic or acoustic feedback components. In some embodiments, the case 1690 can be configured to generate supplemental feedback that either substitutes (i.e., no feedback is generated by the portable electronic device 1650) or provides feedback that supplements feedback generated by the portable electronic device 200.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not intended to be exhaustive or to limit the embodiments to the precise forms disclosed. It will be apparent to one of ordinary skill in the art that many modifications and variations are possible in view of the above teachings.

What is claimed is:

1. A portable electronic device configured to be carried within a recess defined by sides of a case, comprising:
    a housing having walls that define a cavity capable of carrying operational components,
        wherein the operational components include:
        a processor,
        a sensor in communication with the processor, wherein when the housing is carried within the recess of the case, the sensor is capable of (i) detecting a stimulus that is applied to at least one of the walls by the sides of the case, and (ii) providing a detection signal to the processor that is based on a strength of the stimulus as detected by the sensor,
        an interface unit capable of interacting with a user, and
        a feedback unit in communication with the interface unit and the processor, the feedback unit capable of providing a baseline feedback response that is perceptible to the user during the interaction, wherein when the sensor detects the stimulus, the detection signal provided to the processor by the sensor causes the processor to respond by instructing the feedback unit to alter the baseline feedback response to provide an adjusted feedback response based on the strength of the stimulus.

2. The portable electronic device of claim 1, wherein the case has a magnetic element embedded within at least one of the sides, the magnetic element providing a magnetic field.

3. The portable electronic device of claim 2, wherein when the portable electronic device is carried within the recess, the magnetic field provided by the magnetic element is the stimulus that is detectable by the sensor.

4. The portable electronic device of claim 3, wherein the interface unit is a switch assembly having a user accessible button that is responsive to a press event, and wherein the feedback unit is capable of providing a tangible feedback force in response to the press event.

5. The portable electronic device of claim 4, wherein when the portable electronic device is carried in the case and the sensor detects the magnetic field, the processor causes the feedback unit to alter the tangible feedback force in a manner that at least partially compensates for the user accessible button being covered by the at least one of the sides.

6. The portable electronic device of claim 4, wherein the sensor is capable of detecting an amount of strain that is exerted by a portion of the at least one side having the magnetic element embedded therein against the user accessible button.

7. The portable electronic device of claim 1, wherein the feedback unit is capable of generating any combination of acoustic feedback or haptic feedback.

8. The portable electronic device of claim 7, wherein the feedback unit is capable of balancing a first amount of acoustic feedback with a second amount of haptic feedback.

9. The portable electronic device of claim 1, wherein, when the sensor detects less than a threshold level of external ambient sound, the processor prevents the feedback unit from generating acoustic feedback.

10. The portable electronic device of claim 5, further comprising a display that is carried by the housing of the portable electronic device, wherein the user accessible button is carried along the wall of the housing, and wherein the sensor is disposed internally to the user accessible button.

11. A consumer product system, comprising:
    a portable electronic device, comprising:
        a housing having walls defining a cavity that is capable of carrying operational components, wherein the operational components include:
            a processor,
            a sensor in communication with the processor, the sensor being capable of (i) detecting a stimulus having a strength that is applied to at least one of the walls, and (ii) responding by providing a detection signal to the processor, wherein the detection signal is based on a strength of the stimulus, and
            a feedback component in communication with the processor and the sensor, the feedback component capable of generating a baseline feedback response; and
    a case, comprising:
        a body having sides that define a recess, wherein the portable electronic device is capable of being carried within the recess, and the sides are capable of applying the stimulus to the at least one wall, and
        a magnetic element embedded in at least one of the sides, the magnetic element providing a magnetic field that when detected by the sensor, the sensor sends a signal to the processor indicating that the portable electronic device is carried within the recess, and the processor responds to the signal by instructing the feedback component to alter the baseline feedback response to provide an adjusted feedback response based on the strength of the stimulus.

12. The consumer product system of claim 11, wherein the portable electronic device further comprises an interface unit having a user accessible button that is responsive to a press event, and wherein the interface unit is capable of providing tangible feedback force in response to the press event.

13. The consumer product system of claim 12, wherein the processor causes the feedback component to alter the tangible feedback force in a manner that at least partially compensates for the user accessible button being covered by the at least one side of the case.

14. The consumer product system of claim 13, wherein the sensor is capable of detecting an amount of strain that is exerted by the at least one side against the user accessible button.

15. The consumer product system of claim 11, wherein the feedback component is capable of generating any combination of acoustic feedback or haptic feedback.

16. The consumer product system of claim 15, wherein the feedback component is capable of balancing a first amount of acoustic feedback with a second amount of haptic feedback.

17. A method for generating feedback at an electronic device, the electronic device including a housing having walls that define a cavity capable of carrying operational components, the housing capable of being carried within a recess defined by sides of a case, wherein the operational components include an interface unit, a sensor, and a feedback unit, the method comprising:
    in response to detecting a press event at the interface unit of the electronic device while the housing is carried within the recess of the case:
        receiving a detection signal from the sensor when the sensor detects a stimulus that is applied to at least one the walls by at least one of the sides of the case while detecting the press event, wherein the detection signal is based on a strength of the stimulus; and
        instructing the feedback unit of the electronic device to alter an initial feedback response associated with the press event to provide an adjusted feedback response that is based on the strength of the stimulus.

18. The method of claim 17, wherein the stimulus is an external magnetic field generated by a magnetic element embedded within the at least one side of the case.

19. The method of claim 18, wherein the interface unit is a switch assembly that is covered by the at least one side of the case, and the feedback unit is capable of altering the adjusted feedback response in a manner that at least partially compensates for the switch assembly being covered by the at least one side.

20. The method of claim 17, wherein the feedback unit is capable of generating any combination of acoustic feedback or haptic feedback.

* * * * *